(12) United States Patent
Inoue

(10) Patent No.: US 10,757,286 B2
(45) Date of Patent: Aug. 25, 2020

(54) INFORMATION PROCESSING SYSTEM FOR PERFORMING A SERIES OF PROCESSES ON ELECTRONIC DATA

(71) Applicant: Yuusuke Inoue, Kanagawa (JP)

(72) Inventor: Yuusuke Inoue, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/352,900

(22) Filed: Mar. 14, 2019

(65) Prior Publication Data

US 2019/0289158 A1    Sep. 19, 2019

(30) Foreign Application Priority Data

Mar. 19, 2018   (JP) ................................ 2018-051824

(51) Int. Cl.
  *H04N 1/00*   (2006.01)
  *G06F 9/50*   (2006.01)
(52) U.S. Cl.
  CPC ....... *H04N 1/00949* (2013.01); *G06F 9/5038* (2013.01); *H04N 1/00511* (2013.01); *H04N 1/00941* (2013.01)
(58) Field of Classification Search
  None
  See application file for complete search history.

(56) References Cited

U.S. PATENT DOCUMENTS

| | | | | |
|---|---|---|---|---|
| 2007/0106995 | A1* | 5/2007 | Osaka | G06Q 10/06 718/106 |
| 2009/0158281 | A1* | 6/2009 | Omori | G06F 9/5038 718/101 |
| 2010/0123933 | A1* | 5/2010 | Takeda | H04N 1/00347 358/1.15 |
| 2012/0239830 | A1* | 9/2012 | Sugimura | G06F 3/14 710/29 |
| 2017/0094119 | A1* | 3/2017 | Fukasawa | H04N 1/4413 |
| 2018/0013913 | A1* | 1/2018 | Hayashi | H04N 1/00344 |

* cited by examiner

*Primary Examiner* — Thomas D Lee
(74) *Attorney, Agent, or Firm* — Oblon, McClelland, Maier & Neustadt, L.L.P.

(57) ABSTRACT

An information processing system includes a plurality of programs, each executing a predetermined process. The information processing system includes a memory and circuitry. The memory stores, for each of applications, each executing a series of processes using electronic data, an application associating flow information with application setting information. The flow information defines program identification information and an execution order. The application setting information defines parameter setting information, group setting information, and flow identification information. The memory further stores use screen information in association with application identification information. The circuitry: receives a first request including the application identification information from a device; transmits the use screen information and the application setting information to the device; receives a second request including the parameters, information on electronic data, and the flow identification information; acquires the flow information; and executes the programs in accordance with the execution order by using the parameters.

9 Claims, 23 Drawing Sheets

FIG. 6

| DATA TYPE BEFORE CONVERSION | DATA TYPE AFTER CONVERSION | TYPE CONVERSION TO BE GENERATED |
|---|---|---|
| InputStream | LocalFilePath | FIRST TYPE CONVERSION |
| LocalFilePath | File | SECOND TYPE CONVERSION |
| ... | ... | ... |

FIG. 9

| PARAMETER NAME | USER INPUT ⓘ | INPUT TYPE | PARAMETER VALUE ⓘ | |
|---|---|---|---|---|
| To ADDRESS ⓘ | YES (REQUIRED) ▾ | TEXT BOX ▾ | sample@example.com | ⚙ |
| Cc ADDRESS ⓘ | NO ▾ | Nothing selected ▾ | | ⚙ |
| Bcc ADDRESS ⓘ | NO ▾ | Nothing selected ▾ | | ⚙ |
| SUBJECT ⓘ | NO ▾ | Nothing selected ▾ | | ⚙ |

Mail: SEND MAIL

SET PARAMETERS

ⓘ PARAMETER SETTING VALUES ARE NORMAL.

* REQUIRED

SET  CANCEL

"workflow application" setting     ✕

① Type selection →   ② Basic settings →   ③ Advanced settings →   ④ Registration

| Flows | Parameters | Default scan settings | Screen settings | Wording |

Select the screen template

Screen template  [wizard ▽]

☑ Enable to create group

Create a new group   G510        G520

Group name  [OCR settings]    [Create Group]

Set the order of the groups and parameters.

| Group : | default | ∧ | ✕ |
|---|---|---|---|
| OCR : Recognize document : OCR language ||||
| OCR : Recognize document : Output file format ||||
| Mail : Send mail : To address ||||
| Mail : Send mail : Subject ||||
| Mail : Send mail : Body ||||

[Back] [Next] [Update] [Cancel]

FIG. 13

"workflow application" setting — G600

① Type selection → ② Basic settings → ③ Advanced settings → ④ Registration

| Flows | Parameters | Default scan settings | Screen settings | Wording |

Select the screen template
Screen template: wizard ▼
☑ Enable to create group

Create a new group
Group name [ ]   Create Group

Set the order of the groups and parameters.  G610

Group: default  ∧   ✕

| OCR : Recognize document : OCR language | G611 |
| OCR : Recognize document : Output file format | G612 |
| Mail : Send mail : To address | O1 |
| Mail : Send mail : Subject | O2 |
| Mail : Send mail : Body | |

Group: OCR settings   ✕   G620

Back  Next  Update  Cancel

FIG. 15

"workflow application" setting　　　　　　　　　　　　　　×

① Type selection →　② Basic settings →　③ Advanced settings →　④ Registration

| Flows | Parameters | Default scan settings | Screen settings | Wording |

Select the screen template
Screen template [ wizard ▽ ]
☑ Enable to create group

Create a new group
[ Group name ] [　　　　　　　　]　[ Create Group ]

Set the order of the groups and parameters.　G810

| Group : | Mail settings | ∧ | × | — G811
　　　　　　　　　　　　　　　　　　　　　— G812
| Mail : Send mail : To address |
| Mail : Send mail : Subject |
| Mail : Send mail : Body |

| Group : | OCR settings | × |
| OCR : Recognize document : OCR language |
| OCR : Recognize document : Output file format |

[ Back ] [ Next ] [ Update ] [ Cancel ]

"workflow application" setting

① Type selection → ② Basic settings → ③ Advanced settings → ④ Registration

| Flows | Parameters | Default scan settings | Screen settings | Wording |

Select the screen template
Screen template: wizard
☑ Enable to create group

Create a new group
Group name [    ]  [Create Group]

Set the order of the groups and parameters.

G1010
Group: OCR settings        ✕
OCR : Recognize document : OCR language
OCR : Recognize document : Output file format G1020
Group: Mail settings    ∧    ✕
Mail : Send mail : To address
Mail : Send mail : Subject
Mail : Send mail : Body

[Back] [Next] [Update] [Cancel]

G1001

INFORMATION PROCESSING SYSTEM FOR PERFORMING A SERIES OF PROCESSES ON ELECTRONIC DATA

CROSS-REFERENCE TO RELATED APPLICATION

This patent application is based on and claims priority pursuant to 35 U.S.C. § 119(a) to Japanese Patent Application No. 2018-051824, filed on Mar. 19, 2018, in the Japan Patent Office, the entire disclosure of which is hereby incorporated by reference herein.

BACKGROUND

Technical Field

The present disclosure relates to an information processing system, an information processing apparatus, and an information processing method.

Description of the Related Art

In recent years, services are known that provide a function obtained by combining a plurality of functions (for example, scanning, printing, e-mail delivery, and the like). For example, a service is known that performs a predetermined process on an electronic file (image file) obtained by scanning and sends an e-mail to which the electronic file on which the predetermined process has been performed is attached. It is known that an application executing such a series of processes can be generated without specialized knowledge such as programming.

SUMMARY

An information processing system includes one or more information processing apparatuses and includes a plurality of programs each executing a predetermined process. The information processing system includes a memory and circuitry. The memory stores, for each of applications, each executing a series of processes using electronic data, an application associating flow information with application setting information, the flow information defining program identification information identifying each of one or more programs executing the series of processes among the plurality of programs and an execution order in which the one or more programs are executed, the application setting information defining: parameter setting information for setting parameters used to execute the one or more programs; group setting information for setting a group to which the parameters belong; and flow identification information identifying the flow information. The memory stores use screen information defining a template of a use screen for using the application in association with application identification information identifying the application. The circuitry receives a first request including the application identification information from a first electronic device of a plurality of electronic devices communicable with the information processing system. The circuitry transmits the use screen information that is stored in the memory in association with the application identification information included in the first request, and the application setting information that is stored in the memory in association with the application identified by the application identification information, to the first electronic device as a requesting source of the first request. The circuitry receives a second request including: the parameters that are set on the use screen that is displayed as being grouped at the first electronic device based on the transmitted use screen information and the parameter setting information and the group setting information defined in the application setting information; information on electronic data specified on the use screen; and the flow identification information defined in the parameter setting information. The circuitry acquires the flow information that is identified by the flow identification information included in the received second request, from the memory. The circuitry executes each of the one or more programs that are identified by the program identification information defined in the acquired flow information in accordance with the execution order defined in the flow information by using the parameters included in the second request, so as to execute the series of processes using the electronic data that is based on the information on the electronic data included in the received second request.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 6 is a diagram illustrating an example of a type conversion information table, according to an embodiment of the present disclosure;

FIG. 9 is an illustration of an example of the workflow application setting screen (3/3), according to an embodiment of the present disclosure;

FIG. 12 is an illustration of an example of the parameter group setting screen (2/7), according to an embodiment of the present disclosure;

FIG. 13 is an illustration of an example of the parameter group setting screen (3/7), according to an embodiment of the present disclosure;

FIG. 15 is an illustration of an example of the parameter group setting screen (5/7), according to an embodiment of the present disclosure;

FIG. 16 is an illustration of an example of the parameter group setting screen (6/7), according to an embodiment of the present disclosure;

FIG. 17 is an illustration of an example of the parameter group setting screen (7/7), according to an embodiment of the present disclosure;

Figure 1:
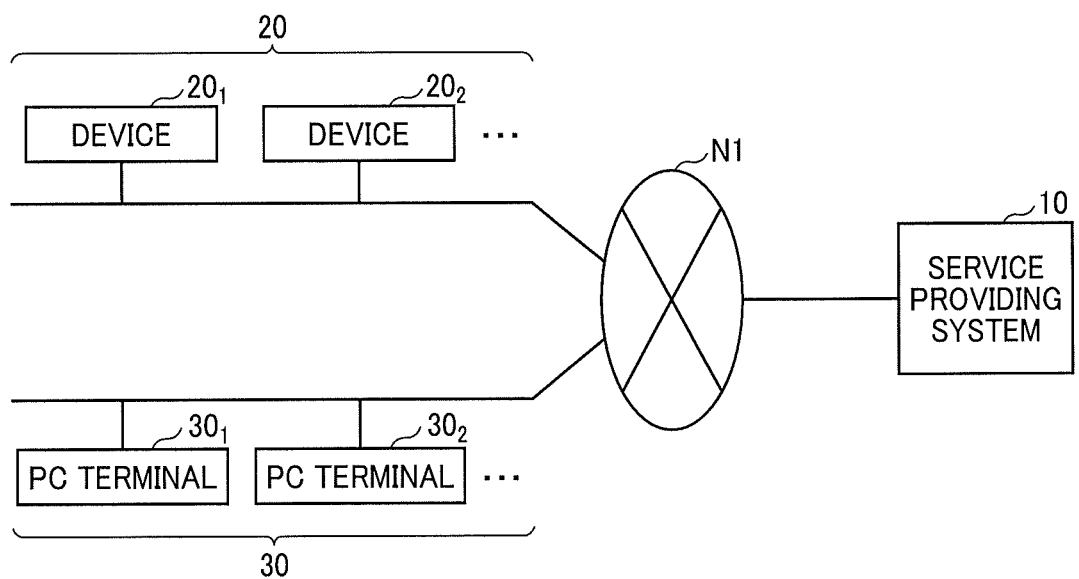
FIG. 1 is a diagram illustrating an example of a system configuration of an information processing system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

According to conventional techniques, when a series of processes is to be executed and parameters of an application are to be input, a user interface (UI) is not suitable for viewing in a case where the number of parameters is large, and an input operation is complicated.

An information processing system according to an embodiment described below provides improved operability at a time when parameters are input during use of an application.

A detailed description is be given hereinafter of an embodiment of the present disclosure with reference to the drawings.

<System Configuration>

First, a description is given of a system configuration of an information processing system 1 according to the present embodiment with reference to FIG. 1. FIG. 1 is diagram illustrating an example of a system configuration of the information processing system 1 according to the present embodiment.

The information processing system 1 illustrated in FIG. 1 includes a service providing system 10, a device $20_1$, a device $20_2$ (collectively or individually referred to as a "device 20", unless they have to be distinguished), and a personal computer (PC) terminal $30_1$, a PC terminal $30_2$ (collectively or individually referred to as a "PC terminal 30", unless they have to be distinguished), which are communicably connected via a wide area network N1 such as the Internet.

The service providing system 10 is implemented by one or more information processing apparatuses and provides various services via the network N1. Each of the various services is implemented by a series of processes in which one or more types of processes are combined among a plurality of processes implementing various functions.

In the embodiment, the functions are functions related to an electronic file such as a document file or an image file. Examples of the functions include printing, scanning, facsimile transmission, data format conversion, e-mail delivery, optical character recognition (OCR) processing, processing on the electronic file, compression, decompression, and storage in a repository.

Specific examples of the services provided by the service providing system 10 according to the present embodiment will be described later. In the following description, the series of processes will also be referred to as a "processing flow".

The device 20 is any of various types of electronic device used by a user. More specifically, examples of the device 20 include an image forming device such as a multifunction peripheral (MFP), a personal computer (PC), a projector, an electronic whiteboard, and a digital camera. By using the device 20, the user can use the various services provided by the service providing system 10.

In the following description, the device 20 is referred to as a "device $20_1$," and a "device $20_2$,", or the like, when distinction between the devices are needed.

Examples of the PC terminals 30 include a desktop PC, a laptop PC, a smartphone, and a tablet terminal used by the user. By using the PC terminal 30, the user can use the various services provided by the service providing system 10.

In the following description, the PC terminal 30 is referred to as a "PC terminal $30_1$", a "PC terminal $30_2$", or the like, when distinction between the PC terminals are needed.

The configuration of the information processing system 1 illustrated in FIG. 1 is merely an example, and another configuration may be adopted. For example, the information processing system 1 according to the present embodiment may include a device of various types that performs at least one of input and output of electronic data, and such device can use the various services provided by the service providing system 10.

<Hardware Configuration>

Figure 2:
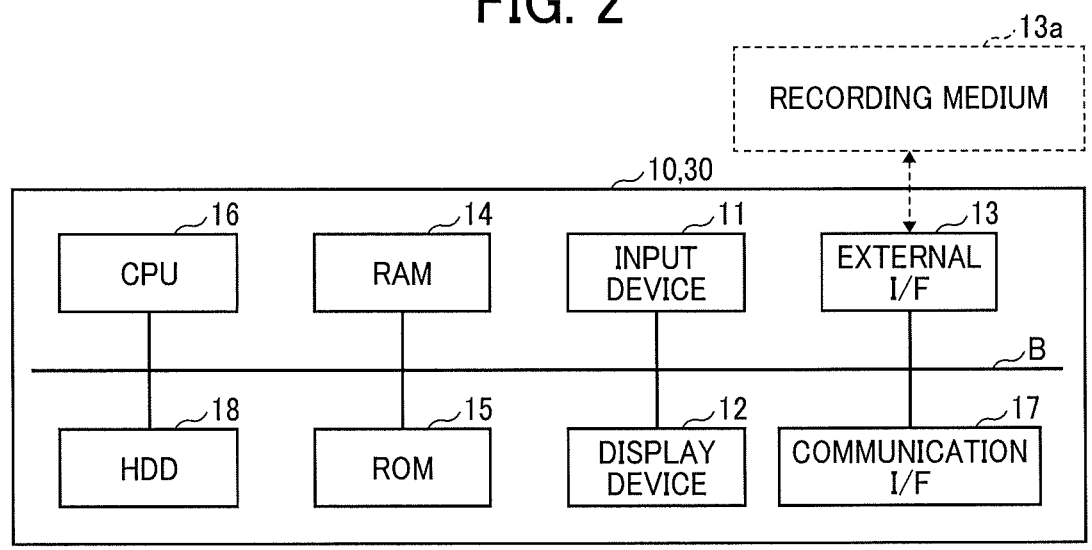
FIG. 2 is a block diagram illustrating an example a hardware configuration of a service providing system and a personal computer (PC) terminal, according to an embodiment of the present disclosure.

Next, a description is given of hardware configurations of the service providing system 10 and the PC terminal 30 included in the information processing system 1 according to the present embodiment with reference to FIG. 2. FIG. 2 is a block diagram illustrating an example of a hardware configuration of the service providing system 10 and the PC terminal 30 according to the present embodiment. The service providing system 10 and the PC terminal 30 have the same hardware configurations. Thus, the following description will mainly be made on the hardware configuration of the service providing system 10.

The service providing system 10 illustrated in FIG. 2 includes an input device 11, a display device 12, an external interface (I/F) 13, and random-access memory (RAM) 14. The service providing system 10 also includes read only memory (ROM) 15, a central processing unit (CPU) 16, a communication I/F 17, and a hard disk drive (HDD) 18. These hardware elements are connected to each other by a bus B.

The input device 11 includes at least one of a keyboard, a mouse, a touchscreen, and the like, and is used by a user to input each operation signal. The display device 12 includes a display or the like and displays a processing result by the service providing system 10. In another example, one or both of the input device 11 and the display device 12 is (are) connected to the service providing system 10 as needed.

The communication I/F 17 is an interface that connects the service providing system 10 to the network N1. As a result, the service providing system 10 can communicate via the communication I/F 17.

The HDD 18 is a non-volatile storage device that stores programs and data. The programs and the data stored in the HDD 18 include: an operating system (OS) as basic software that controls entire operation of the service providing system 10; application software providing the various functions on the OS; and the like.

Instead of the HDD 18, the service providing system 10 may use, as a storage medium, a drive device (for example, a solid-state drive: SSD) using flash memory. In the HDD 18, the stored programs and the stored data are managed by at least one of a predetermined file system and a predetermined database (DB).

The external I/F 13 is an interface with an external device. An example of the external device is a recording medium 13a. Thus, the service providing system 10 can perform reading and writing of the recording medium 13a via the external I/F 13. Examples of the recording medium 13a include a flexible disk, a compact disk (CD), a digital versatile disk (DVD), a Secure Digital (SD) memory card, and a Universal Serial Bus (USB) memory stick.

The ROM 15 is nonvolatile semiconductor memory capable of holding programs and data even when power is turned off. The ROM 15 stores the programs and the data used for a Basic Input/Output System (BIOS), OS settings, network settings, and the like that are made when the service providing system 10 is activated. The RAM 14 is volatile semiconductor memory temporarily holding programs and data.

The CPU 16 is an arithmetic unit that reads the programs and the data from the storage devices such as the ROM 15 and the HDD 18 into the RAM 14 and executes processing, so as to control entire operation of the service providing system 10 and implement functions of the service providing system 10.

With the hardware configuration illustrated in FIG. 2, the service providing system 10 and the PC terminal 30 according to the present embodiment can implement various types of processing as described later.

Figure 3:
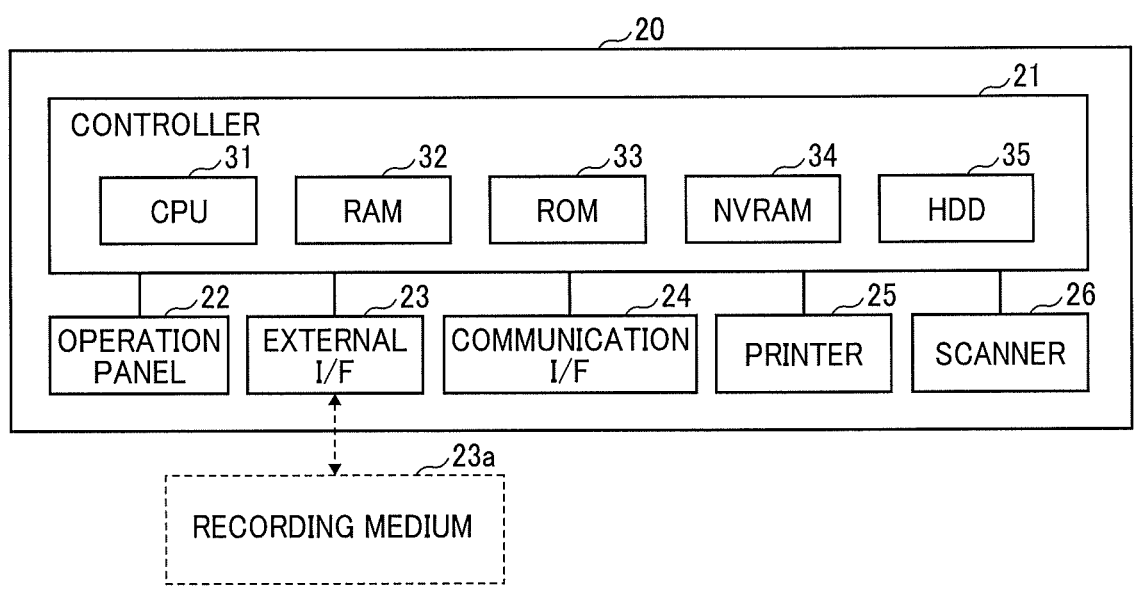
FIG. 3 is a block diagram illustrating an example of a hardware configuration of a device, according to an embodiment of the present disclosure.

Next, a description is given of a hardware configuration of the device 20, which is included in the information processing system 1 according to the present embodiment, in the case where the device 20 is the image forming device with reference to FIG. 3. FIG. 3 is a block diagram illustrating an example of a hardware configuration of the device 20 according to the present embodiment.

The device 20 illustrated in FIG. 3 includes a controller 21, an operation panel 22, an external I/F 23, a communication I/F 24, a printer 25, and a scanner 26. The controller 21 includes a CPU 31, RAM 32, ROM 33, non-volatile random-access memory (NVRAM) 34, and an HDD 35.

The ROM 33 is non-volatile semiconductor memory that stores various programs and various types of data. The RAM 32 is volatile semiconductor memory that temporarily holds programs and data. The NVRAM 34 stores setting information and the like, for example. The HDD 35 is a non-volatile storage device that stores various programs and various types of the data.

The CPU 31 is an arithmetic unit that reads the programs, the data, the setting information, and the like from the ROM 33, the NVRAM 34, the HDD 35, and the like into the RAM 32 and executes processing, so as to control entire operation of the device 20 and implement functions of the device 20.

The operation panel 22 includes: an input unit accepting input from the user; and a display unit performing display. The external I/F 23 is an interface with the external device. An example of the external device is a recording medium 23a. Thus, the device 20 can perform at least one of reading and writing of the recording medium 23a via the external I/F 23. Examples of the recording medium 23a include an integrated circuit (IC) card, the flexible disk, the CD, the DVD, the SD memory card, and the USB memory stick.

The communication I/F 24 is an interface that connects the device 20 to the network N1. As a result, the device 20 can communicate via the communication I/F 24. The printer 25 is a printing device that prints out print data. The scanner 26 is a reading device that reads a document to generate the electronic file (the image file).

With the hardware configuration illustrated in FIG. 3, the device 20 according to the present embodiment can implement various types of processing as described later.

<Services Provided by Service Providing System 10>

A description is given of services provided by the service providing system 10 according to the present embodiment. In the following description, it is assumed that the device 20 is an image forming device.

In the present embodiment, a service that performs an OCR processing on an electronic file (an image file) that is obtained by scanning a document at the device 20 and sends an email to which the electronic file on which the OCR processing has been performed is attached is referred to as a "scan mail service". In the present embodiment, a description is given of an example case where the service providing system 10 provides the scan mail service.

In order to enable the service providing system 10 to provide the scan mail service, an application (application information 1000 described later) that allows the device 20 to use the scan mail service has to be registered in the service providing system 10.

Thus, in the present embodiment, a description is given of the case where the application for use of the scan mail service is registered using the PC terminal 30 and the case where the device 20 uses such an application to use the scan mail service.

However, the service provided by the service providing system 10 is not limited to the scan mail service. For example, the service providing system 10 may provide a service that translates an electronic file obtained by scanning a document at the device 20 into a predetermined language and send the electronic file by e-mail. Alternatively, the service providing system 10 may provide a service that encrypts an electronic file obtained by scanning a document at the device 20 and sends the encrypted electronic file by e-mail.

Similarly, for example, the service providing system 10 may provide a service that adds predetermined information to an electronic file obtained by scanning a document at the device 20 and sends the electronic file to which the information is added by facsimile.

<Functional Configuration>

Figure 4:
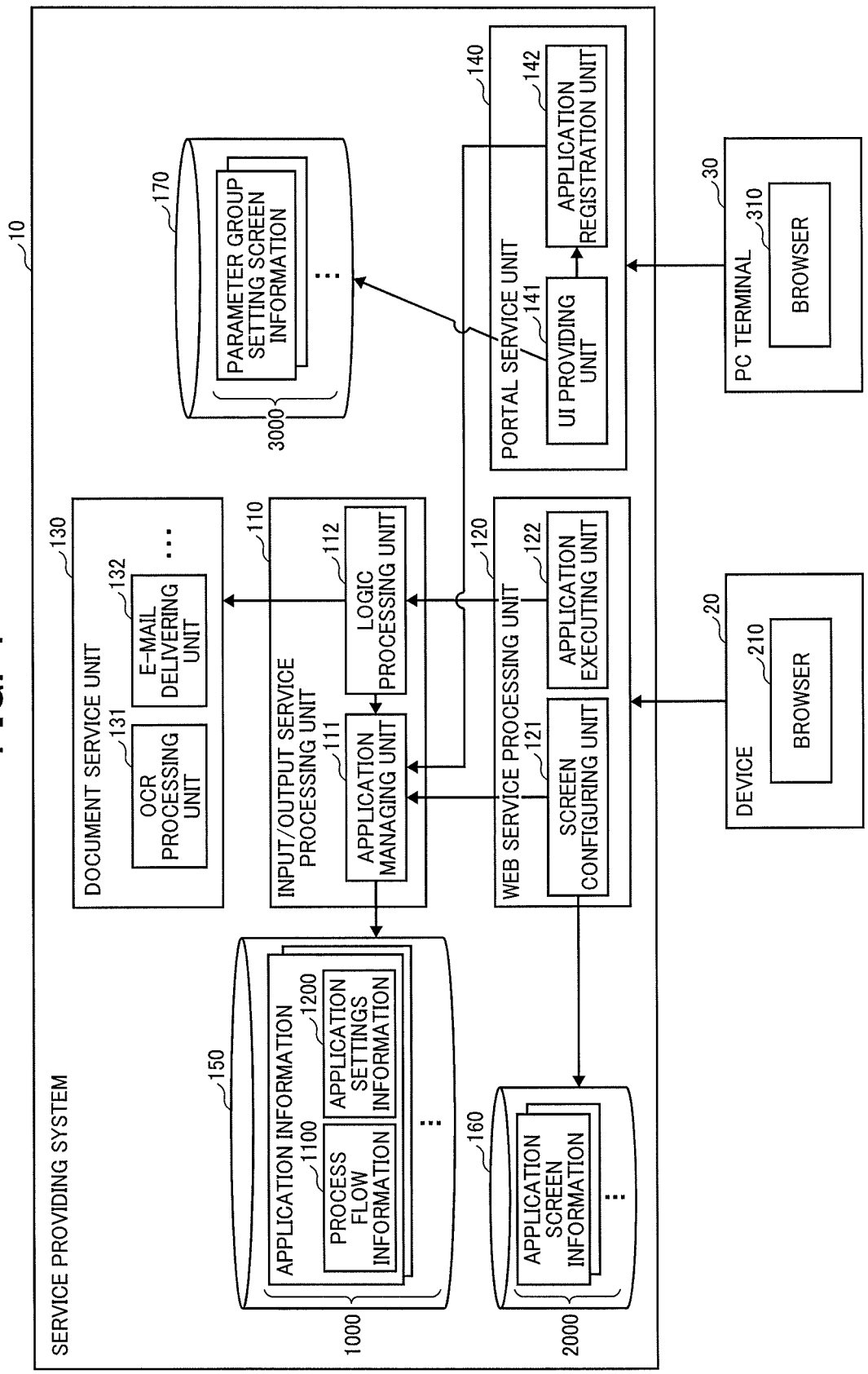
FIG. 4 is a block diagram illustrating an example of a functional configuration of the information processing system, according to an embodiment of the present disclosure.

Next, a description is given of a functional configuration of the information processing system 1 according to the present embodiment with reference to FIG. 4. FIG. 4 is a block diagram illustrating an example of a functional configuration of the information processing system 1 according to the present embodiment.

The PC terminal 30 illustrated in FIG. 4 includes a browser 310 executed by the CPU 16 or the like, for example. The user of the PC terminal 30 can use the browser 310 to register the application, with which the various services including the "scan mail service" are used, in the service providing system 10.

The device 20 illustrated in FIG. 4 includes a browser 210 executed by the CPU 31 or the like, for example. The user of the device 20 can use the browser 210 to use the various services including the "scan mail service". That is, while the device 20 has to include the browser 210, the device 20 does not have to include a dedicated application program or the like, by which the various services provided by the service providing system 10 are used, for example.

The service providing system 10 illustrated in FIG. 4 includes an input/output service processing unit 110, a Web service processing unit 120, a document service unit 130, and a portal service unit 140. Each of such functional units is implemented by processing that the one or more programs installed in the service providing system 10 make the CPU 16 execute.

The service providing system 10 also includes an application information storage unit 150, an application screen information storage unit 160, and a parameter group setting screen information storage unit 170. Each of such storage units can be implemented by using the HDD 18. In another example, at least one of such storage units can be implemented by using a storage device or the like that is connected to the service providing system 10 via the network N1.

The input/output service processing unit 110 executes processing related to the service provided by the service providing system 10. The input/output service processing unit 110 includes an application managing unit 111 and a logic processing unit 112.

The application managing unit 111 manages the application information 1000 stored in the application information storage unit 150. The application information 1000 is the application, with which the service implemented by the series of processes is used. In other words, the application information 1000 provides the various services provided by the service providing system 10.

In response to a request from the logic processing unit 112, the application managing unit 111 sends processing flow information 1100 included in the application information 1000 to the logic processing unit 112. The processing flow information 1100 is information in which the series of processes implementing the service provided by the application information 1000 is defined.

Furthermore, in response to a request from the portal service unit 140, the application managing unit 111 stores the application information 1000 in the application information storage unit 150. In this way, the application information 1000 (the application), which provides the service, is registered in the service providing system 10.

In response to a request from the Web service processing unit 120, the logic processing unit 112 acquires the processing flow information 1100 included in the application information 1000 from the application managing unit 111. Then, on the basis of the processing flow information 1100 acquired from the application managing unit 111, the logic processing unit 112 executes the series of the processes (the processing flow) implementing the service provided by the application information 1000. In this way, the service providing system 10 according to the present embodiment can provide the various services including the "scan mail service". A detailed description on the logic processing unit 112 will be provided later.

The Web service processing unit 120 executes processing to allow the user to use the browser 210 of the device 20 so as to use the various services. More specifically, the Web service processing unit 120 functions as an application server that provides the browser 210 with a Web application (the application information 1000). The Web service processing unit 120 includes a screen structuring unit 121 and an application executing unit 122.

In response to a request from the browser 210, the screen structuring unit 121 sends application screen information 2000, which is stored in the application screen information storage unit 160, and application setting information 1200, which is included in the application information 1000 stored in the application information storage unit 150, to the browser 210.

The application screen information 2000 is information in which a template of a screen (an application screen) for use of the service provided by the application information 1000 is defined. For example, the application screen information 2000 is information in which the template of the application screen is defined by HyperText Markup Language (HTML), Extensible HTML (XHTML), Cascading Style Sheets (CSS), JavaScript, or the like.

The application setting information 1200 is information in which various settings of the application (the application information 1000) are defined. For example, in the application setting information 1200, of parameter information used to execute the series of processes, parameter information input by the user, parameter information set by default, and the like are defined. In addition, for example, in the application setting information 1200, input items, in which the user inputs the parameter information on the application screen, display information (for example, an application name) on the application screen, and the like are defined. The application setting information 1200 is information in which the various settings of the application are defined by JavaScript Object Notation (JSON) or the like, for example.

In this way, the browser 210 displays the application screen, on which the service provided by the service providing system 10 is used, in the device 20.

In response to a request from the browser 210, the application executing unit 122 transmits a request to execute the application (the application information 1000) to the input/output service processing unit 110.

The document service unit 130 executes predetermined processing that is included in the series of processes (the processing flow) based on the processing flow information 1100. The document service unit 130 includes an OCR processing unit 131 and an e-mail delivering unit 132.

The OCR processing unit 131 executes the OCR processing on the electronic file. The e-mail delivering unit 132 creates an e-mail to which the electronic file is attached, and sends the e-mail to a designated e-mail address.

In addition to the above functional units, the document service unit 130 may also include various functional units such as a compression/decompression processing unit that performs at least one of compression and decompression of the electronic file and a data format converting unit that converts a data format of the electronic file.

The portal service unit 140 executes processing in which the user uses the browser 310 of the PC terminal 30 to register the application, and the like. The portal service unit 140 includes a UI delivery unit 141 and an application registration unit 142.

In response to a request from the browser 310, the UI delivery unit 141 sends parameter group setting screen information 3000 stored in the parameter group setting screen information storage unit 170 to the browser 310. A parameter group setting screen is a Web site on which settings such as creation, deletion, and editing of a parameter group can be made by using the browser 310.

The parameter group setting screen information 3000 is information in which various screens including the parameter group setting screen, an application registration screen, and the like are defined. The parameter group setting screen information 3000 is information in which the various screens are defined on the browser 210 in HTML, Extensible Markup Language (XML), CSS, JavaScript, or the like.

In this way, the browser 310 displays the parameter group setting screen and the application registration screen in the PC terminal 30. Thus, the user of the PC terminal 30 can perform a registration operation of the application (the application information 1000) on the application registration screen.

In response to a request from the UI delivery unit 141, the application registration unit 142 requests the application managing unit 111 to register the application (the application information 1000). That is, when the application registration operation is performed on the application registration screen, the application registration unit 142 requests the application managing unit 111 to register the application.

The application information storage unit 150 stores the application information 1000. The application information 1000 is stored in the application information storage unit 150 in association with an application ID identifying the application information 1000. For example, the application ID is one of a Uniform Resource Locator (URL) of the application information 1000, identification information included in the URL of the application information 1000, and the like.

The application information 1000 includes the processing flow information 1100 and the application setting information 1200. For example, the application information 1000 providing the scan mail service includes: the processing flow information 1100 in which the series of the processes implementing such a service is defined; and the application setting information 1200 in which the various settings of the application information 1000 are defined. The application information 1000 providing the scan mail service will also be referred to as a "scan mail application" below.

The application information 1000 may include two or more types of the processing flow information 1100 and two or more types of the application setting information 1200.

As described above, the processing flow information 1100 is the information in which the series of the processes (the processing flow) implementing the service provided by the application information 1000 is defined. A detailed description on the processing flow information 1100 will be provided later.

As described above, the application setting information 1200 is the information in which the various settings of the application (the application information 1000) are defined. A detailed description on the application setting information 1200 will be provided later.

The application screen information storage unit 160 stores the application screen information 2000. The application screen information 2000 is stored in the application screen information storage unit 160 in association with the application ID.

The parameter group setting screen information storage unit 170 stores the parameter group setting screen information 3000. The parameter group setting screen information 3000 is stored in the parameter group setting screen information storage unit 170 in association with URLs of the parameter group setting screen, the application registration screen, and the like.

The input/output service processing unit 110, the Web service processing unit 120, the document service unit 130, and the portal service unit 140 can be implemented by different information processing apparatuses.

Figure 5:
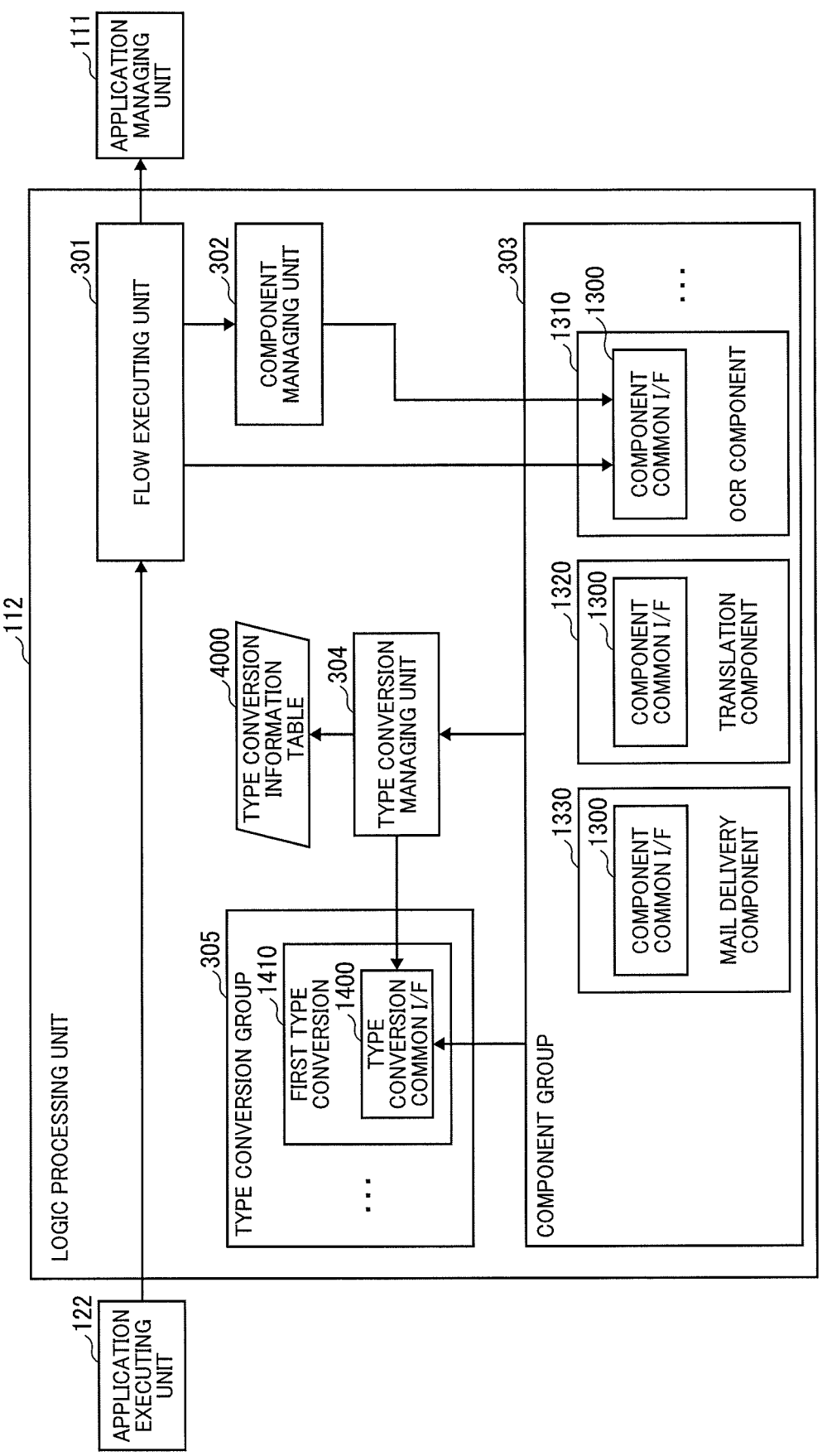
FIG. 5 is a block diagram illustrating an example of a functional configuration of a logic processing unit, according to an embodiment of the present disclosure.

A description is given of a detailed functional configuration of the logic processing unit 112 with reference to FIG. 5. FIG. 5 is a block diagram illustrating an example of a functional configuration the logic processing unit 112 according to the present embodiment.

The logic processing unit 112 illustrated in FIG. 5 includes a flow executing unit 301, a component managing unit 302, a component group 303, a type conversion managing unit 304, and a type conversion group 305. The logic processing unit 112 also includes a type conversion information table 4000.

When receiving the application execution request from the application executing unit 122, the flow executing unit 301 acquires the processing flow information 1100 corresponding to the execution request from the application managing unit 111. Then, the flow executing unit 301 executes the series of processes (the processing flow) based on the processing flow information 1100 acquired from the application managing unit 111.

The series of processes, which is based on the processing flow information 1100, is executed by combining components used to execute each of the processing included in the series of processes. Each of the components is implemented by a program, a module, or the like that executes the processing implementing the predetermined function, and is defined by a class, a function, or the like, for example.

The component managing unit 302 manages the components. In response to a request from the flow executing unit 301, the component managing unit 302 generates the component and returns the generated component to the flow executing unit 301. The generation of the component means to load the component, which is defined by the class, the function, or the like, onto the memory (for example, the RAM 14).

The component group 303 is a collection of the components. The component group 303 includes an OCR component 1310, a translation component 1320, and an e-mail delivery component 1330.

The OCR component 1310 is a component for performing OCR processing on an electronic file (image file). The OCR component 1310 requests the OCR processing unit 131 of the document service unit 130 to perform an OCR process, thereby performing OCR processing on the electronic file.

The translation component 1320 is a component for translating the electronic file such as a text file of the document written in a predetermined language into another language. The e-mail delivery component 1330 is a component for sending an e-mail to the designated e-mail address. The e-mail delivery component 1330 requests the e-mail delivering unit 132 of the document service unit 130 to execute mail sending processing, thereby sending the e-mail to the designated e-mail address.

As described above, each of the components executes the processing realizing the predetermined function. In addition to the above components, the component group 303 also includes various components including, for example, an encryption/decryption component used to encrypt and decrypt the electronic file, a compression component used to compression the electronic file, and the like.

Each of the components included in the component group 303 has a component common I/F 1300. The component common I/F 1300 is an application programming interface (API) commonly defined for the components, and includes an API for generating the component and an API for executing the processing of the component.

Just as described, since each of the components has the component common I/F 1300, an influence resulted from addition of the component and the like can be localized. That is, for example, the component can be added, and the like without affecting the flow executing unit 301, the component managing unit 302, and the like. As a result, in the service providing system 10 according to the present embodiment, it is possible to reduce development man-hours associated with addition of the predetermined function and the like (that is, the addition of the component used to execute the processing realizing the function, and the like).

The type conversion managing unit 304 manages type conversions of data types. The data type that can be handled by each of the components is determined in advance. Thus, in response to a request from the component, the type conversion managing unit 304 refers to the type conversion information table 4000 illustrated in FIG. 6, for example, and generates the type conversion included in the type conversion group 305.

Then, the type conversion managing unit 304 requests the generated type conversion to execute type conversion processing. The type conversion is realized by a program, a module, or the like that executes the type conversion processing of the data type, and is defined by a class, a function, or the like, for example. The generation of the type conversion means to load the type conversion, which is defined by the class, the function, or the like, onto the memory (for example, the RAM 14).

Examples of the data types include "InputStream" indicating stream data, "LocalFilePath" indicating a path (an address) of the electronic file stored in the storage device or the like, and "File" indicating an entity of the electronic file.

A description is given of the type conversion information table 4000 with reference to FIG. 6. FIG. 6 is an illustration of an example of the type conversion information table 4000.

The type conversion information table 4000 illustrated in FIG. 6 has, as data items, the data type before conversion, the data type after conversion, and the type conversion to be generated. More specifically, type conversion information stored in the type conversion information table 4000 is information in which the type conversion for converting the data type before the conversion to the data type after the conversion is associated with each of the data types before the conversion and the data types after the conversion.

The type conversion group 305 is a collection of the type conversions. The type conversion group 305 includes a first type conversion 1410 used to convert the data type "InputStream" to the data type "LocalFilePath". In addition to the first type conversion 1410, the type conversion group 305 also includes a second type conversion used to convert the data type "LocalFilePath" to the data type "File", and the like, for example.

Each of the type conversions included in the type conversion group 305 has a type conversion common I/F 1400. The type conversion common I/F 1400 is an API commonly defined for the type conversions, and includes an API for generating the type conversion and an API for executing the type conversion processing of the type conversion.

Just as described, since each of the type conversions has the type conversion common I/F 1400, an influence resulted from addition of the type conversion and the like can be localized. That is, for example, the type conversion can be added, and the like without affecting the type conversion managing unit 304 and the like. As a result, in the service providing system 10 according to the present embodiment, it is possible to reduce the development man-hours associated with addition of the type conversion, and the like.

<Processing Details>

Next, a description is given of details of an operation performed by the information processing system 1 according to the present embodiment. First, a description is given of an example case where a user performs a setting operation of a workflow application with reference to FIGS. 7 to 9.

Figure 7:
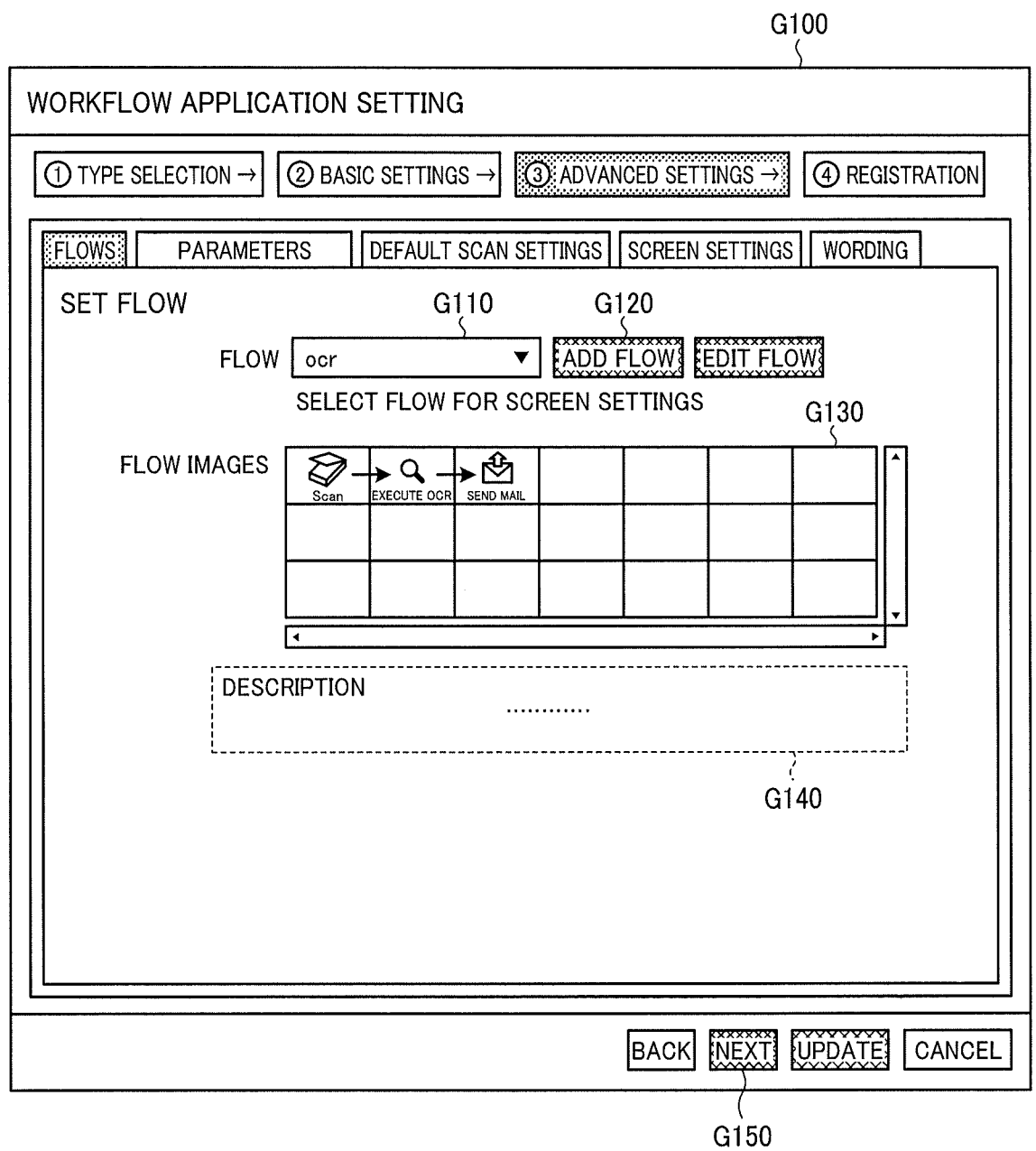
FIG. 7 is an illustration of an example of a workflow application setting screen (1/3), according to an embodiment of the present disclosure.

A workflow setting screen G100 illustrated in FIG. 7 is a screen on which the user sets workflow application basic information.

The workflow setting screen G100 illustrated in FIG. 7 includes: a flow selection field G110 for selecting a flow to be added; a button G120 for adding the selected flow; a flow display field G130 displaying the series of processes that are set; a description field G140 displaying a description of the series of processes that are set; and a "Next" button G150 for causing the current screen to transition to a next screen.

In the following description, it is assumed that the user makes various settings of the workflow on the workflow setting screen G100 as illustrated in FIG. 7 and then presses the "Next" button G150. Then, the browser 310 accepts such an operation and displays a workflow setting screen G200 illustrated in FIG. 8, for example.

Figure 8:
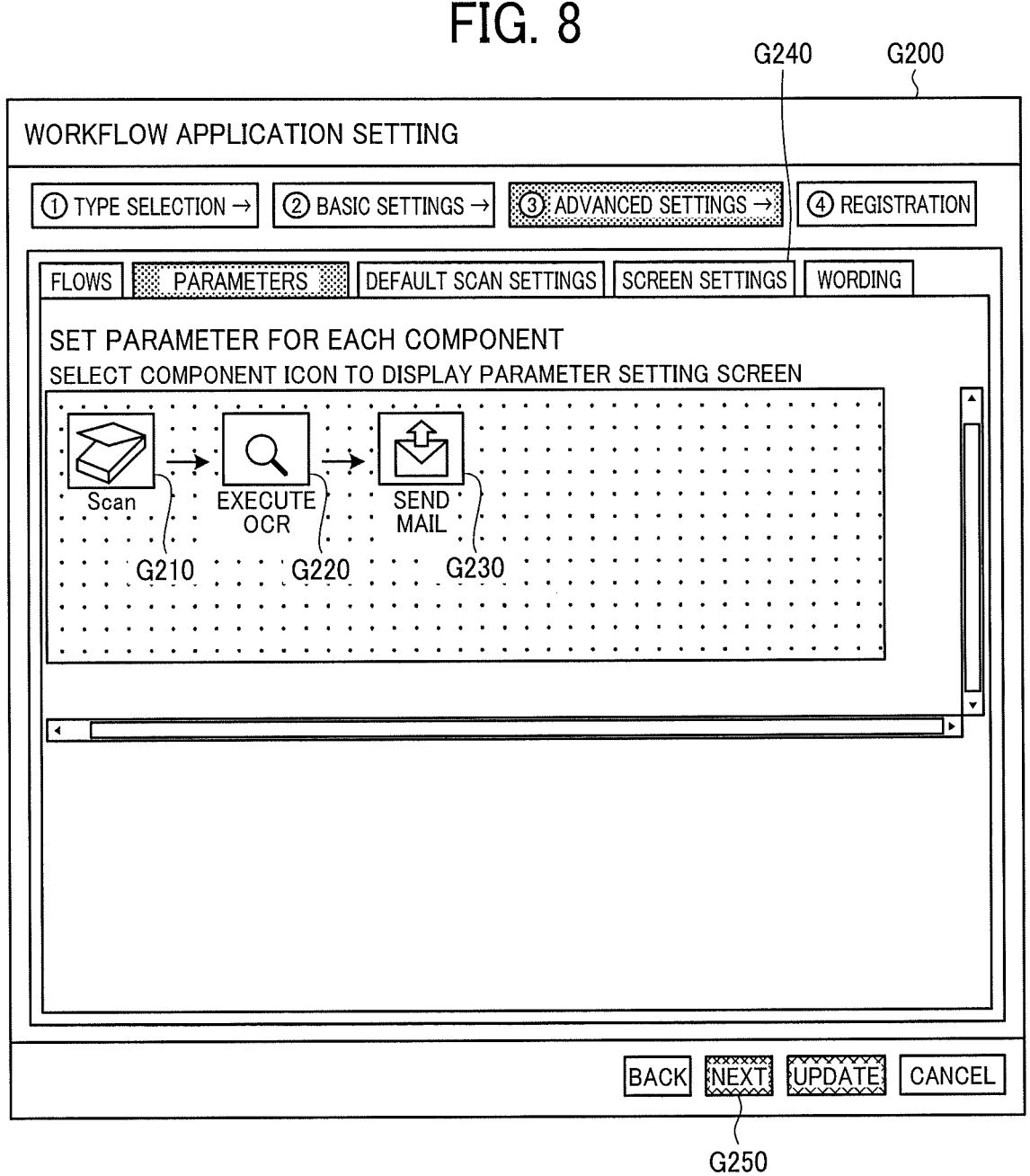
FIG. 8 is an illustration of an example of the workflow application setting screen (2/3), according to an embodiment of the present disclosure.

The workflow setting screen G200 illustrated in FIG. 8 includes: a "Scan" button G210 for setting parameters of a scan-type application; an "Execute OCR" button G220 for setting parameters of an OCR-type application; a "Send mail" button G230 for setting parameters of an e-mail sending-type application; a button G240 for making a transition to a screen on which screen settings are made to separately display the parameters by group; and a "Next" button G250 for making a transition to the next screen.

In the following description, it is assumed that the user performs an operation to press the "Send mail" button G230 on the workflow setting screen G200 illustrated in FIG. 8. Then, the browser 310 accepts such an operation and displays a workflow setting screen G300 illustrated in FIG. 9, for example. The workflow setting screen G300 is displayed in a pop-up format to overlap the workflow setting screen G200. However, the display format of the workflow setting screen G300 is not particularly limited.

The workflow setting screen G300 illustrated in FIG. 9 includes: a selection field G310 in which the user selects whether to input a sending destination; a selection field G320 in which the user selects a format of a field in which the user inputs the sending destination; a sending destination entry field G330 in which the e-mail sending destination is entered; and a button G340 for registering the settings.

Returning to FIG. 8, in the following description, it is assumed that the user performs an operation to press the button G240 on the workflow setting screen G200 illustrated in FIG. 8.

Figure 10:
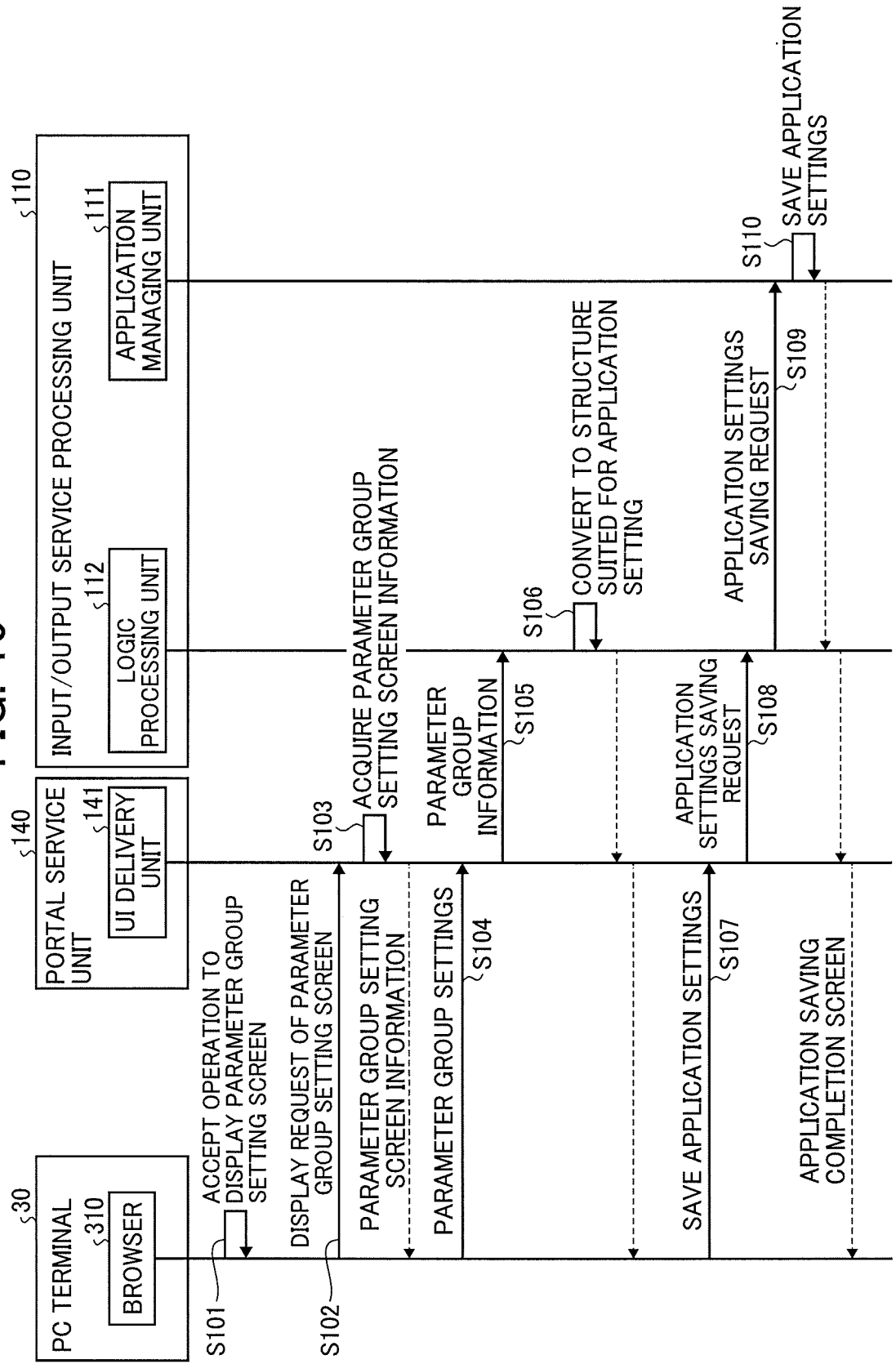
FIG. 10 is a sequence chart of an example of parameter group setting processing according to the embodiment of the present disclosure.

Next, a description is given of an operation in which the user of the PC terminal 30 sets the parameter group and registers the set parameter group in the service providing system 10 with reference to FIG. 10. FIG. 10 is a sequence chart of an example of parameter group setting processing.

First, the browser 310 of the PC terminal 30 accepts an operation to display the parameter group setting screen (step S101). Here, the user of the PC terminal 30 can press the button G240 illustrated in FIG. 8 to perform a display operation of the parameter group setting screen.

When accepting the display operation of the parameter group setting screen, the browser 310 of the PC terminal 30 transmits a request to display the parameter group setting screen to the UI delivery unit 141 of the portal service unit 140 (step S102).

When receiving the display request of the parameter group setting screen, the UI delivery unit 141 of the portal service unit 140 acquires the parameter group setting screen information 3000 of the parameter group setting screen from the parameter group setting screen information storage unit 170 (step S103). Then, the UI delivery unit 141 returns the parameter group setting screen information 3000 acquired from the parameter group setting screen information storage unit 170 to the browser 310.

Figure 11:
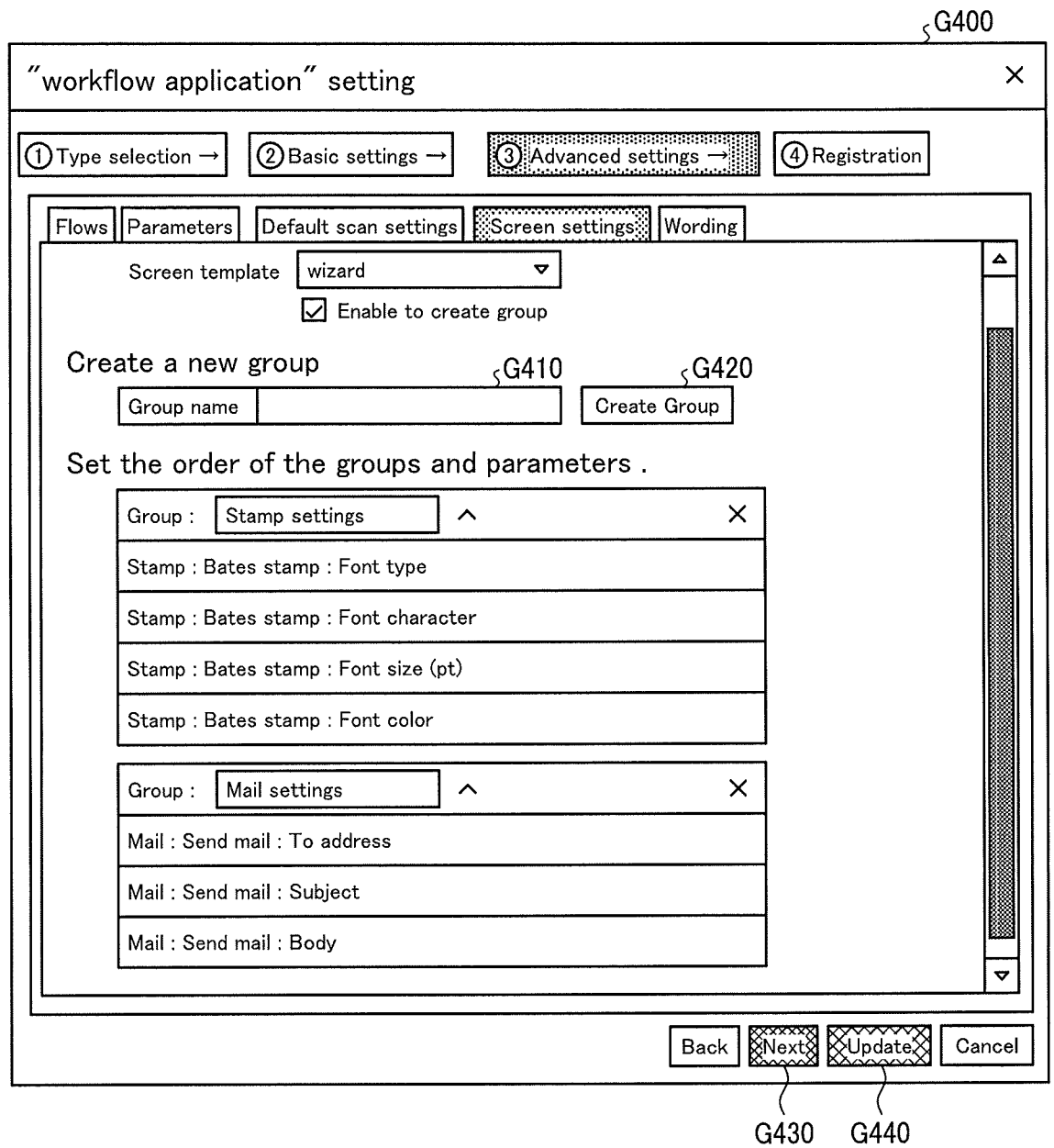
FIG. 11 is an illustration of an example of a parameter group setting screen (1/7), according to an embodiment of the present disclosure.

When receiving the parameter group setting screen information 3000 of the parameter group setting screen, the browser 310 of the PC terminal 30 displays a parameter group setting screen G400 illustrated in FIG. 11, for example, on the basis of the parameter group setting screen information 3000.

A description is given of an example case where the user performs a setting operation of the parameter group with reference to FIGS. 11 to 17.

The parameter group setting screen G400 illustrated in FIG. 11 is a screen on which the user sets basic information on parameter group settings.

The parameter group setting screen G400 illustrated in FIG. 11 includes: a "Group name" input setting field G410 for setting a name of the parameter group; a "Create Group" button G420 for registering the parameter group; a "Next" button G430 for making a transition to the next screen; an "Update" button G440 for registering the parameter group, for which the settings are made; and the like.

A parameter group setting screen G500 illustrated in FIG. 12 includes: a "Group name" input setting field G510 for setting a name of the parameter group; and a "Create Group" button G520 for registering the parameter group.

In the following description, it is assumed that the user inputs a group name "OCR settings" in the "Group name" input setting field G510 and presses the "Create Group" button G520. Then, the browser 310 accepts such an operation and transmits a request to change the parameter group settings to the UI delivery unit 141 of the portal service unit 140 (step S104).

When receiving the change request of the parameter group settings, the UI delivery unit 141 of the portal service unit 140 transmits parameter group information, in which the parameter group settings are changed, to the logic processing unit 112 of the input/output service processing unit 110 (step S105). The parameter group information is an example of group setting information. The group setting information includes information on the group that is set by operating the parameter group setting screen G500. More specifically, the group setting information includes the group name, a display order of a plurality of the groups on the application screen, types of the parameters belonging to the group, a display order of the plurality of the parameters belonging to the group on the application screen, and the like. When the group is deleted, the information on the group is deleted from the group setting information.

When receiving the parameter group information, the logic processing unit 112 of the input/output service processing unit 110 converts a structure of the parameter group into a structure suited for application setting (step S106). As described so far in steps S104 to S106, the structure of the parameter group is dynamically converted in accordance with the user's operation. Then, the browser 310 of the PC terminal 30 displays a parameter group setting screen G600 illustrated in FIG. 13.

The parameter group setting screen G600 illustrated in FIG. 13 includes a "default" group G610 and a newly created "OCR settings" group G620.

The "default" group G610 includes, as the parameter settings of the OCR-type application, an "OCR language" icon G611 and an "Output file format" icon G612.

The "OCR language" icon G611 is an icon representing processing that requests acquisition of a parameter used to set the language in the OCR processing of the electronic file.

The "Output file format" icon G612 is an icon representing processing that requests acquisition of a parameter used to set the output file format in the OCR processing of the electronic file.

Here, it is assumed that the user performs an operation O1 to drag the parameter group setting screen G600 from the "OCR language" icon G611 to a portion below or the inside of the "OCR settings" group G620 by using the mouse as the input device 11, for example. Similarly, it is assumed that the user performs an operation O2 to drag the parameter group setting screen G600 from the "Output file format" icon G612 to the portion below or the inside of the "OCR settings" group G620 by using the mouse as the input device 11, for example. Then, the same processing as the processing in steps S104 to S106 is executed. The browser 310 accepts such an operation and displays a parameter group setting screen G700 illustrated in FIG. 14, for example. When the same operation is performed, the display order can be changed within the group. For example, it is assumed that the user performs an operation to drag the parameter group setting screen G600 from the "OCR language" icon G611 to the inside of the "Output file format" icon G612 by using the mouse as the input device 11, for example. At this time, the "Output file format" icon G612 is displayed on top of the "OCR language" icon G611.

Figure 14:
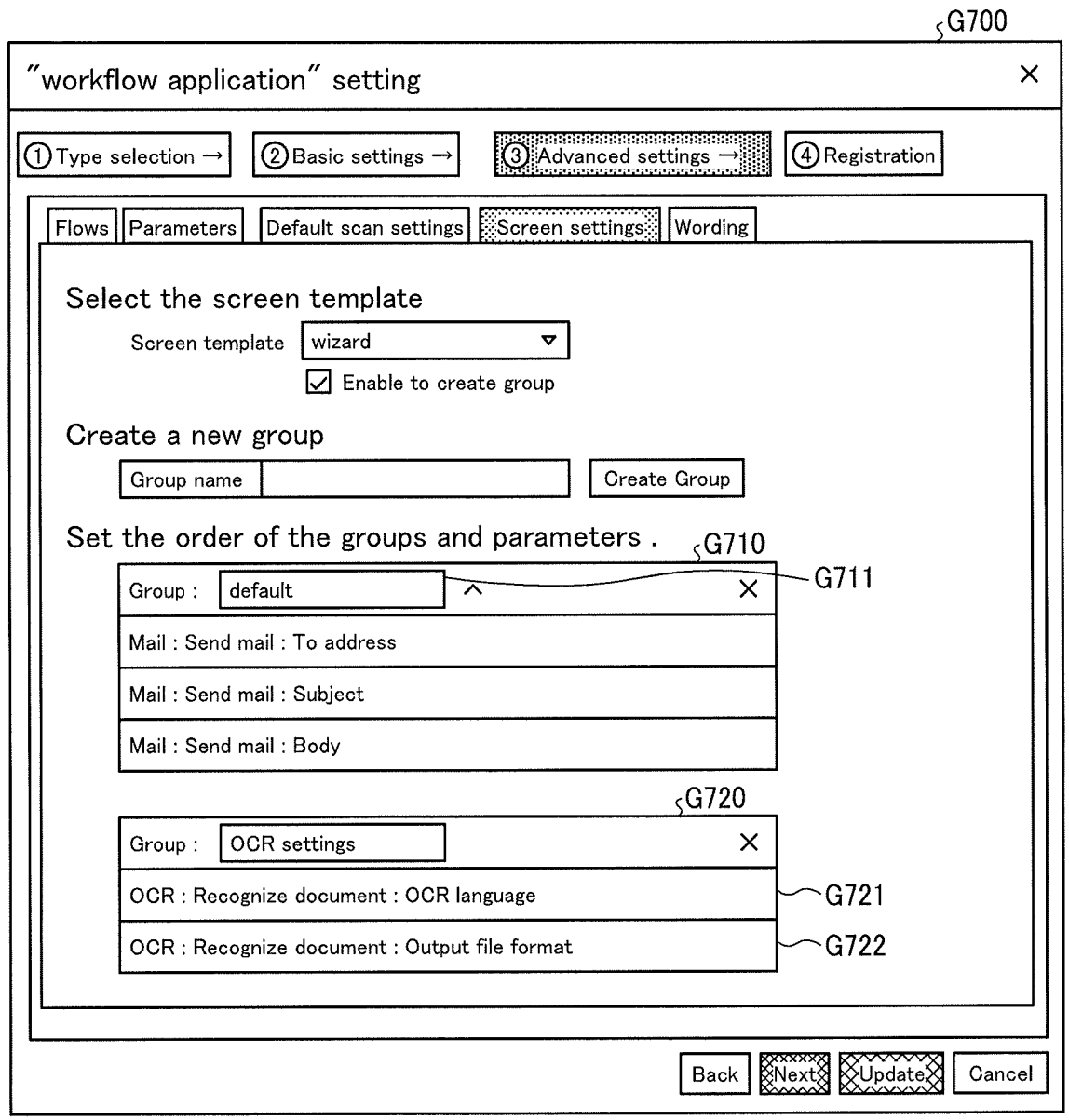
FIG. 14 is an illustration of an example of the parameter group setting screen (4/7), according to an embodiment of the present disclosure.

The parameter group setting screen G700 illustrated in FIG. 14 includes a "default" group G710 and a newly created "OCR settings" group G720.

The "OCR settings" group G720 includes, as the parameter settings of the OCR-type application, an "OCR language" icon G721 and an "Output file format" icon G722. That is, these two icons are moved from the "default" group G710 to the "OCR settings" group G720. The "OCR language" icon G721 and the "Output file format" icon G722 may be moved along with the movement of the mouse as the input device 11, for example.

The parameter group setting screen G700 illustrated in FIG. 14 also includes a "Group name" input setting field G711 for setting the group name. When the mouse as the input device 11 is clicked on this "Group name" input setting field G711, the group name can be changed. It is assumed that the user uses the keyboard as the input device 11, for example, to delete "default" in the input setting field G711 and inputs "Mail settings". Then, the same processing as the processing in steps S104 to S106 is executed. The browser 310 accepts such an operation and displays a parameter group setting screen G800 illustrated in FIG. 15, for example.

The parameter group setting screen G800 illustrated in FIG. 15 includes a "Group name" input setting field G811 for setting the group name. The group name is changed from "default" to "Mail settings" by the user's operation.

The parameter group setting screen G800 illustrated in FIG. 15 also includes a button G812 for deleting the group.

Figure 16:
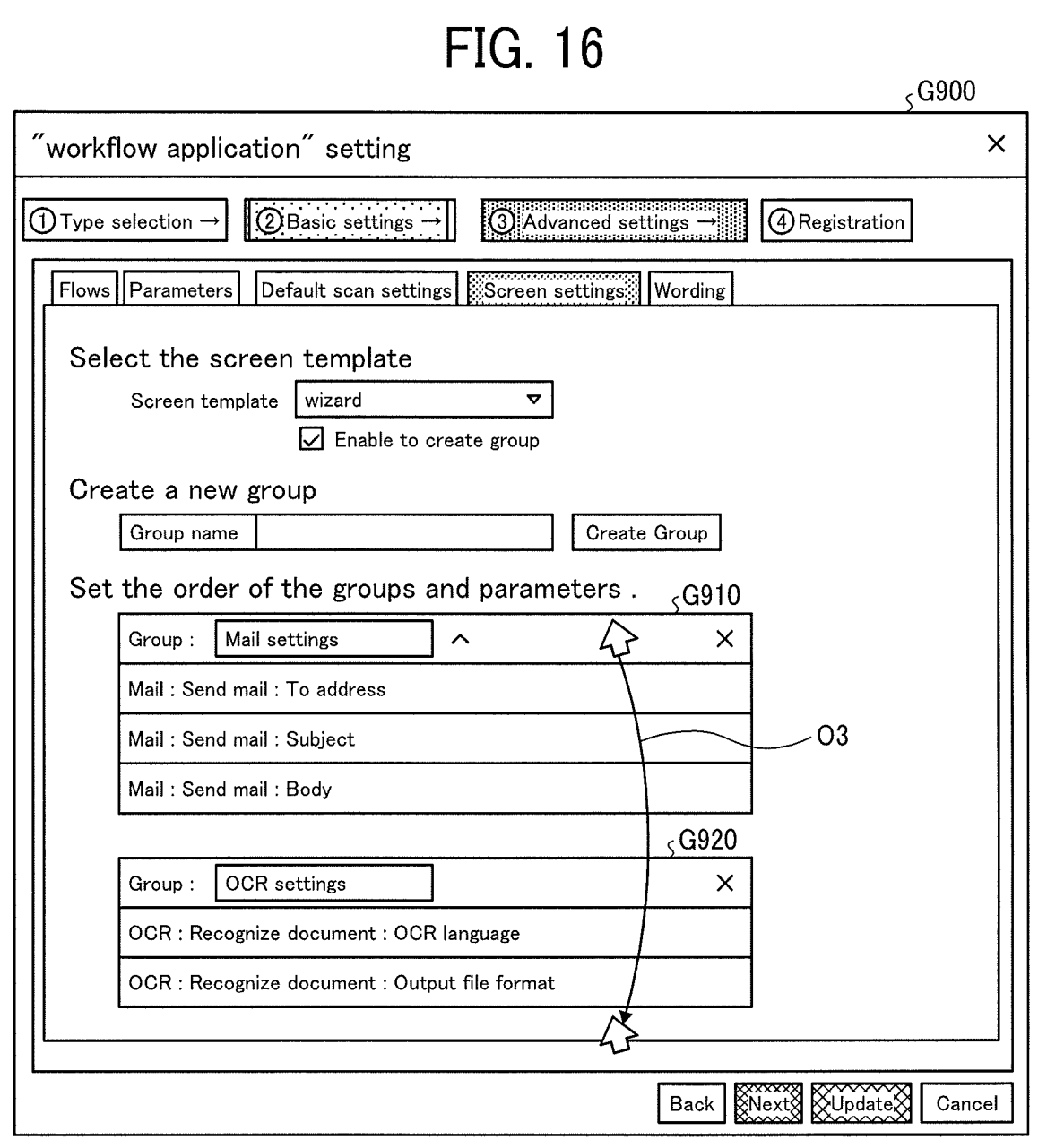

A parameter group setting screen G900 illustrated in FIG. 16 includes a "Mail settings" group G910 and an "OCR settings" group G920.

It is assumed that the user performs an operation O3 to drag the parameter group setting screen G900 from the "Mail settings" group G910 to a portion below or the inside of the "OCR settings" group G920 by using the mouse as the input device 11, for example. Then, the same processing as the processing in steps S104 to S106 is executed. The browser 310 accepts such an operation and displays a parameter group setting screen G1000 illustrated in FIG. 17, for example.

The parameter group setting screen G1000 illustrated in FIG. 17 includes an "OCR settings" group G1010 and a "Mail settings" group G1020. That is, an order of the "OCR settings" group G1010 and the "Mail settings" group G1020 is switched. The display order on this screen corresponds to a display order of parameter input screens at the time when the scan mail service is executed. For example, the screen, on which the parameters of the group displayed at the top on the screen are input, is displayed first.

The parameter group setting screen G1000 illustrated in FIG. 17 also includes an "Update" button G1001 for registering the set parameter group.

Here, it is assumed that the user performs an operation to press the "Update" button G1001. Then, the browser 310 accepts an operation to save the parameter group settings.

Figure 18:
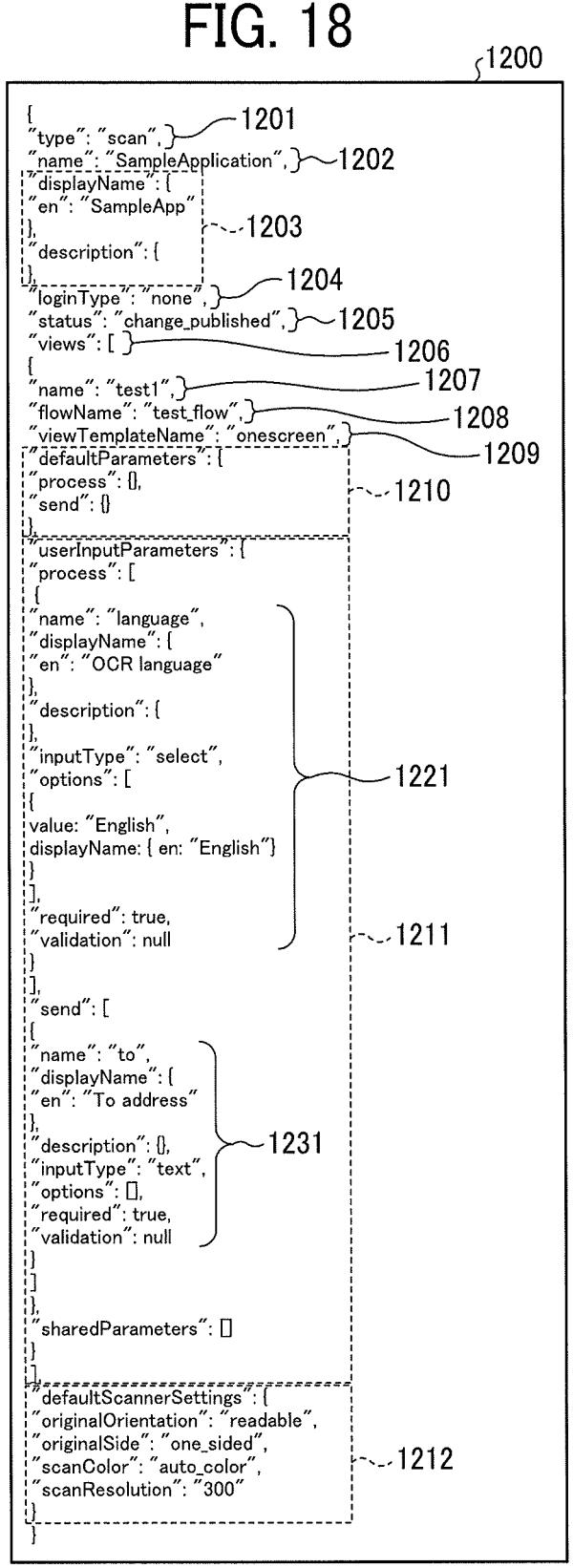
FIG. 18 is an illustration of an example of application setting information, according to an embodiment of the present disclosure.

When accepting the operation to save the parameter group settings, the browser 310 creates the application setting information 1200 illustrated in FIG. 18, for example.

A description is given of the application setting information 1200 with reference to FIG. 18. FIG. 18 is an illustration of an example of the application setting information 1200.

The application setting information 1200 illustrated in FIG. 18 includes an application type 1201, an application name 1202, an application display name 1203, an authentication type 1204, a status 1205, a display 1206, a name 1207, and a flow name 1208. The application setting information 1200 illustrated in FIG. 18 also includes a design template type 1209, default parameters 1210, user input parameters 1211, and the like.

The application type 1201 is a type of the application selected on the workflow setting screen G100 illustrated in FIG. 7. In an example illustrated in FIG. 18, "type": "scan" indicating that the application type is a scan type is defined.

The application name 1202 is the application name input in an "application name" input setting field. In the example illustrated in FIG. 18, ""name": "SampleApplication"" indicating that the application name is "SampleApplication" is defined.

The application display name 1203 is an application name (a title) displayed on the application screen. In the example illustrated in FIG. 18, it is defined that "SampleApp" is displayed in English.

The authentication type 1204 is authentication selected in an "authentication" selection field on the application registration screen. In the example illustrated in FIG. 17, ""loginType": "none"" indicating that the authentication is not performed is defined.

The flow name 1208 is a flow name selected in a flow selection field on the application registration screen. In the example illustrated in FIG. 18, ""flowName": "test_flow"" indicating that the flow name is "test_flow" is defined.

The design template type 1209 is the display format selected in a "design template" selection field on the application registration screen. In the example illustrated in FIG. 18, ""viewTemplateName": "onescreen"" indicating that the application screen is displayed in a single screen format is defined.

In the default parameters 1210, the parameter information for which the user does not input parameter values on the application screen is defined. In the default parameters 1210, the parameter information for which the parameter values are set by default is defined. In other words, in the default parameters 1210, the parameter information for which the user does not set the parameter values is defined.

In the user input parameters 1211, the parameter information for which the user inputs the parameter values on the application screen is defined. That is, in the user input parameter 1211, the parameter information, which is set on the parameter group setting screens illustrated in FIGS. 11 to 17, is defined.

As described so far, in the application setting information 1200, the display information (for example, the title) displayed on the application screen, the input items (items for inputting or selecting the parameter values) of the application screen, an input method for each of the input items, and the like are defined. In addition, in the application setting information 1200, the parameter information for which the parameter values are set by default (that is, the parameter information for which the parameter value is neither input nor selected on the application screen), and the like are defined.

When creating the application setting information 1200, the browser 310 transmits a request to save the application settings, in which the parameter group settings are changed on the basis of the information included in the parameter group information, to the UI delivery unit 141 of the portal service unit 140 (Step S107). The application settings saving request includes the created application setting information 1200.

The UI delivery unit 141 of the portal service unit 140 transmits the application settings saving request to the logic processing unit 112 of the input/output service processing unit 110 (step S108).

When receiving the application settings saving request, the logic processing unit 112 of the input/output service processing unit 110 transmits the settings saving request to the application managing unit 111 of the input/output service processing unit 110 (step S109).

When receiving the application settings saving request, the application managing unit 111 of the input/output service processing unit 110 saves the application settings (step S110). Then, the application managing unit 111 sends a settings change result to the browser 310.

That is, the application managing unit 111 stores the application setting information 1200, which is included in the application settings saving request, in the application information storage unit 150 in association with the application ID. In this way, the application information 1000, which includes the application setting information 1200 and the processing flow information 1100 of the flow name defined in the flow name 1208 of the application setting information 1200, is set in the service providing system 10.

As described so far, in the information processing system 1 according to the present embodiment, the user can use the PC terminal 30 to register the application in the service providing system 10. In addition, in the information processing system 1 according to the present embodiment, the user can use the PC terminal 30 to easily register the application (the application information 1000) by setting the flow name, the parameter information of each of the components, and the like, for example.

Therefore, in the information processing system 1 according to the present embodiment, even the user who does not have expert knowledge or experience in a programming language and the like (for example, a person in charge of planning), for example, can register the application (the application information 1000) providing the various services.

Figure 19:
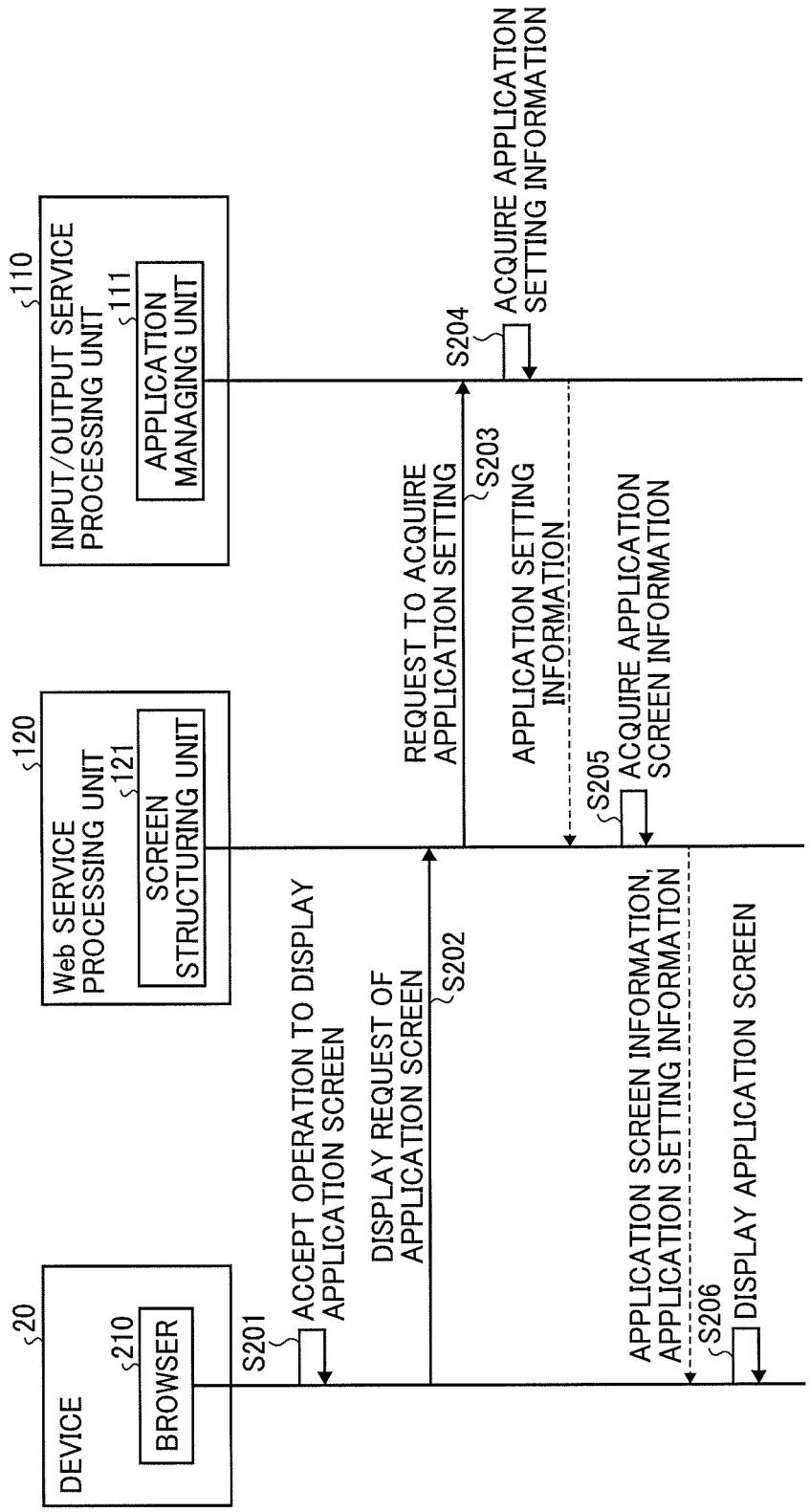
FIG. 19 is a sequence chart of an example of processing to execute a processing flow that implements a scan mail service, according to an embodiment of the present disclosure.

Next, a description is given of an example case where the user of the device 20 uses the scan mail service with reference to FIG. 19. FIG. 19 is a sequence chart of an example of overall processing in a case where the scan mail service is used.

First, the browser 210 of the device 20 accepts an operation (a display operation) to display the application screen of the scan mail service (step S201). For example, the user of the device 20 inputs a URL of the application screen of the scan mail service into an address bar of the browser 310, and thus can perform the display operation of the application screen.

When accepting the display operation of the application screen of the scan mail service, the browser 210 of the device 20 transmits a request to display the application screen of the scan mail service to the screen structuring unit 121 of the Web service processing unit 120 (step S202). The display request of the application screen of the scan mail service includes the application ID of the application information 1000 that provides the scan mail service.

When receiving the display request of the application screen of the scan mail service, the screen structuring unit 121 of the Web service processing unit 120 transmits a request to acquire the application settings to the application managing unit 111 of the input/output service processing unit 110 (step S203). The acquisition request of the application settings includes the application ID of the application information 1000 that provides the scan mail service.

When receiving the acquisition request of the application settings, the application managing unit 111 of the input/output service processing unit 110 acquires the application setting information 1200, which is stored in association with the application ID included in the acquisition request, from the application information storage unit 150 (step S204). Then, the application managing unit 111 returns the application setting information 1200, which is acquired from the application information storage unit 150, to the screen structuring unit 121.

Next, the screen structuring unit 121 of the Web service processing unit 120 acquires the application screen information 2000, which is stored in association with the application ID of the application information 1000 providing the scan mail service, from the application screen information storage unit 160 (step S205). Then, the screen structuring unit 121 returns the application screen information 2000, which is acquired from the application screen information storage unit 160, and the application setting information 1200, which is returned in above step S204, to the browser 210.

The browser 210 of the device 20 displays the application screen on the basis of the application screen information 2000 and the application setting information 1200 received from the screen structuring unit 121 (step S206).

Figure 20:
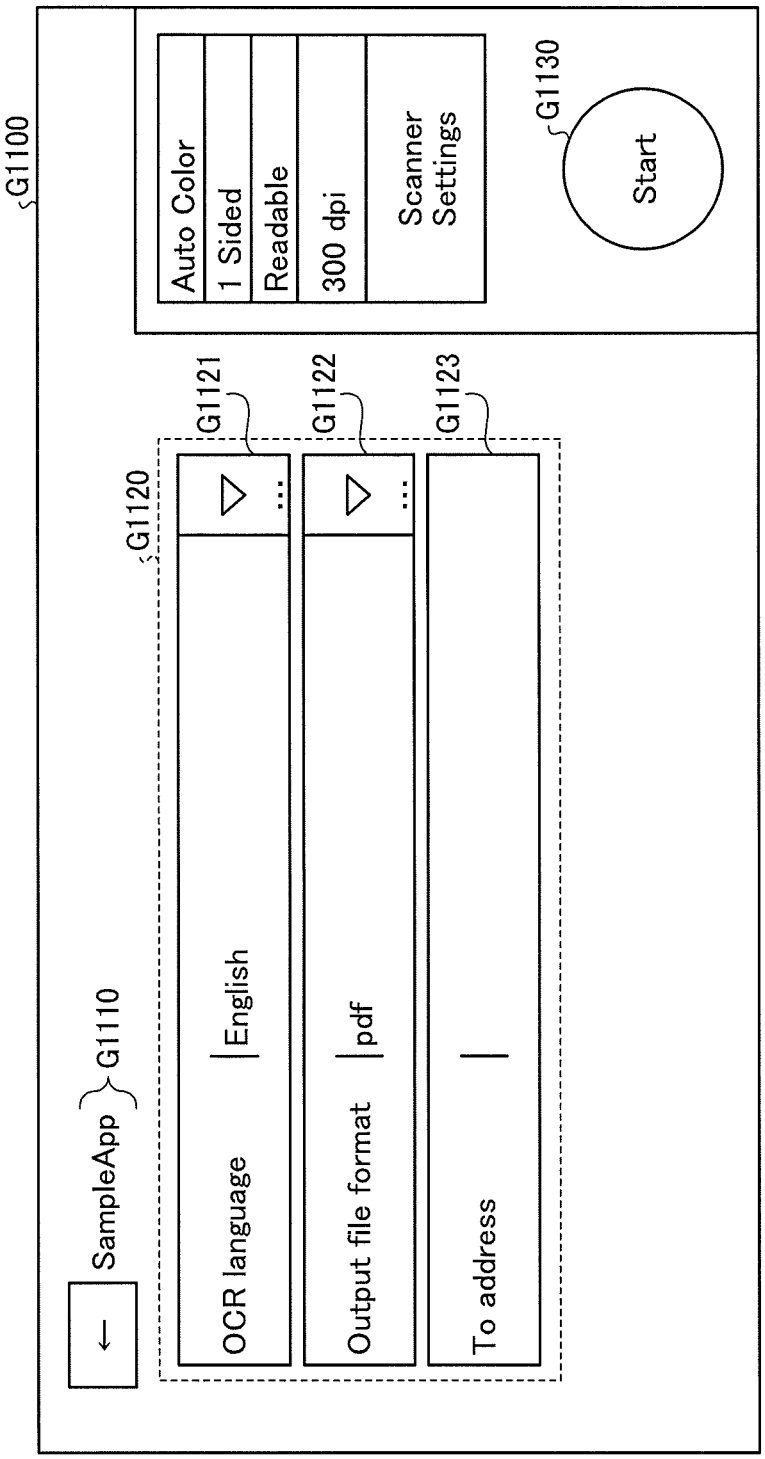
FIG. 20 is an illustration of an example of a parameter setting screen (1/3), according to an embodiment of the present disclosure.

An application screen G1100 illustrated in FIG. 20 is a screen on which the user of the device 20 uses the scan mail service.

The application screen G1100 illustrated in FIG. 20 includes an application name G1110, a parameter input area G1120, and a "Start" button G1130. The parameter input area G1120 includes an OCR language input field G1121, an output file format input field G1122, and a mail sending destination input field G1123.

The application name G1110 is displayed on the basis of the application display name 1203 of the application setting information 1200 illustrated in FIG. 18. In the case where the application names (the titles) are defined in a plurality of the languages in the application display name 1203, the application name in the language corresponding to the language setting of the browser 210 is displayed in the application name G1110.

The OCR language input field G1121, the output file format input field G1122, and the mail sending destination input field G1123 are displayed on the basis of the user input parameters 1211 of the application setting information 1200 illustrated in FIG. 18.

That is, the OCR language input field G1121 is displayed on the basis of an input definition 1221 of the user input parameter 1211. Similarly, the mail sending destination input field G1123 is displayed on the basis of an input definition 1231 of the user input parameter 1211. In FIG. 18, processing corresponding to the output file format input field G1122 is omitted.

As described above, the application name and the parameter input area are displayed on the application screen, on which the user of the device 20 uses the service, on the basis of the information defined in the application setting information 1200.

It is assumed that, on the application screen G1100 illustrated in FIG. 20, the user inputs "English" in the OCR language input field G1221, "pdf" in the output file format input field G1122, and "abc@abc.co.jp" in the mail sending destination input field G1123. It is also assumed that the user then performs an operation (an execution operation) to press the "Start" button G1130 on the application screen G1100 illustrated in FIG. 20.

Then, the browser 210 of the device 20 accepts the execution operation. The browser 210 of the device 20 controls the scanner 26, reads the document, and thus generates the electronic file (the image file) in a pdf format.

When generating the electronic file (the image file), the browser 210 of the device 20 transmits the application execution request to the application executing unit 122 of the Web service processing unit 120. The application execution request includes the flow name "test_flow" defined in the flow name 1208 of the application setting information 1200, the generated electronic file, and the parameter setting information.

The parameter setting information is the parameter information, which is defined in the default parameters 1210 of the application setting information 1200, and the parameter information, for which the user sets the parameter values on the application screen G1100.

More specifically, the parameter information, for which the user sets the parameter values on the application screen G1100, is ""language": "English"" and ""to": "abc@abc.co.jp"".

When receiving the application execution request, the application executing unit 122 of the Web service processing unit 120 transmits the execution request to the logic processing unit 112 of the input/output service processing unit 110.

Next, when receiving the application execution request, the logic processing unit 112 of the input/output service processing unit 110 executes execution processing of the processing flow. That is, the logic processing unit 112 executes the series of processes that are based on the processing flow information 1100 of the flow name included in the request. A detailed description on the execution processing of the processing flow will be provided later.

Then, the logic processing unit 112 returns a processing result of the execution processing of the processing flow to the browser 210 via the Web service processing unit 120. In this way, the service providing system 10 according to the present embodiment can provide the scan mail service.

A description is given of the application screen according to the present embodiment. In the present embodiment, an application screen G1200 and an application screen G1300, which are respectively illustrated in FIG. 21 and FIG. 22 and set on the basis of the group setting information, are displayed as the application screens. On each of the application screen G1200 and the application screen G1300, the parameters to be input are displayed by the group on the basis of the group setting information. A description is given of an example case where there are two groups to be input.

Figure 21:
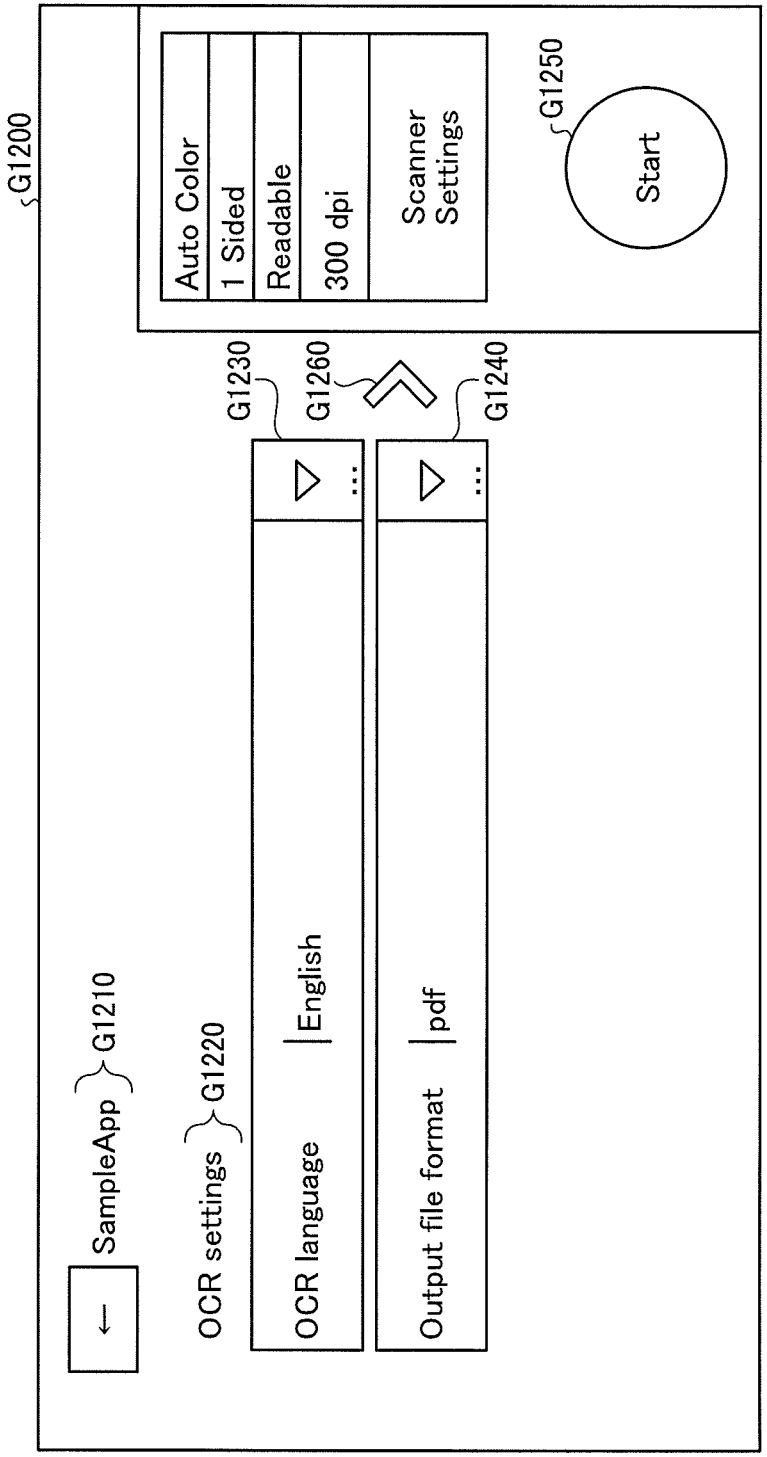
FIG. 21 is an illustration of an example of the parameter setting screen (2/3), according to an embodiment of the present disclosure.

On the application screen G1200 illustrated in FIG. 21, an application name G1210 and the parameters related to the OCR processing are displayed as the group. The application screen G1200 includes a group name "OCR settings" G1220, an OCR language input field G1230, an output file format input field G1240, and a "Start" button G1250.

Figure 22:
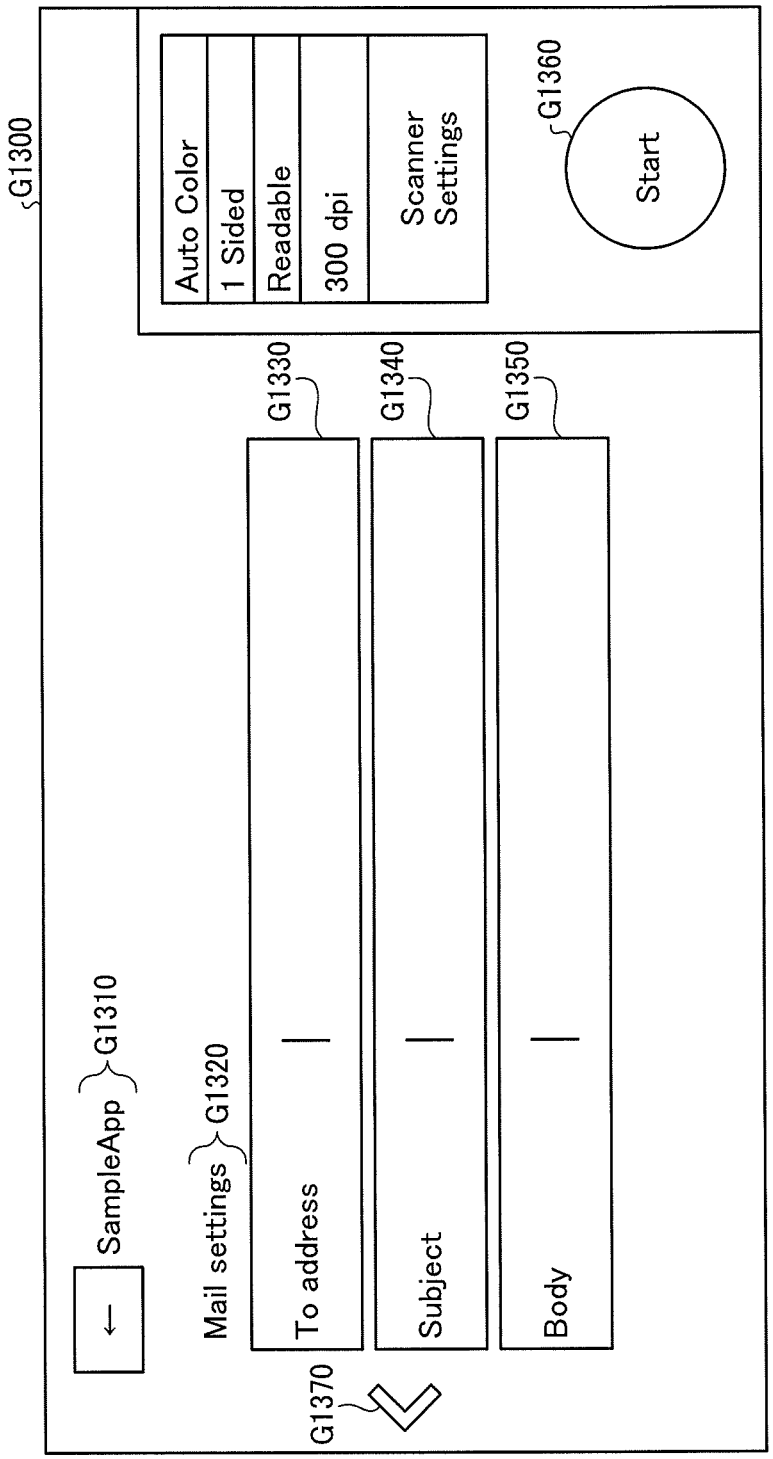
FIG. 22 is an illustration of an example of the parameter setting screen (3/3), according to an embodiment of the present disclosure.

On the application screen G1300 illustrated in FIG. 22, an application name G1310 and the parameters related to the mail sending processing are displayed as the group. The application screen G1300 includes a group name "Mail settings" G1320, a mail sending destination input field G1330, a mail subject input field G1340, a mail body input field G1350, and a "Start" button G1360.

The application screen G1200 in FIG. 21 and the application screen G1300 in FIG. 22 can be switched by pressing a button G1260 in FIG. 21 or a button 1370 in FIG. 22. In addition, the plurality of the parameters related to the single type of the processing can be grouped and displayed in the single page. As a result, the operability at the time of inputting the parameters during use of the application is improved.

As it has been described so far, in the information processing system 1 according to the present embodiment, the plurality of the parameters is grouped and displayed in the single page. Thus, the user can use the PC terminal 30 to input the plurality of the parameters in the single page. The plurality of the parameters related to the one type of the processing is grouped and displayed in the single page. As a result, the information processing system 1 according to the present embodiment provides the superior operability at the time of inputting the parameters during the use of the application.

Figure 23:
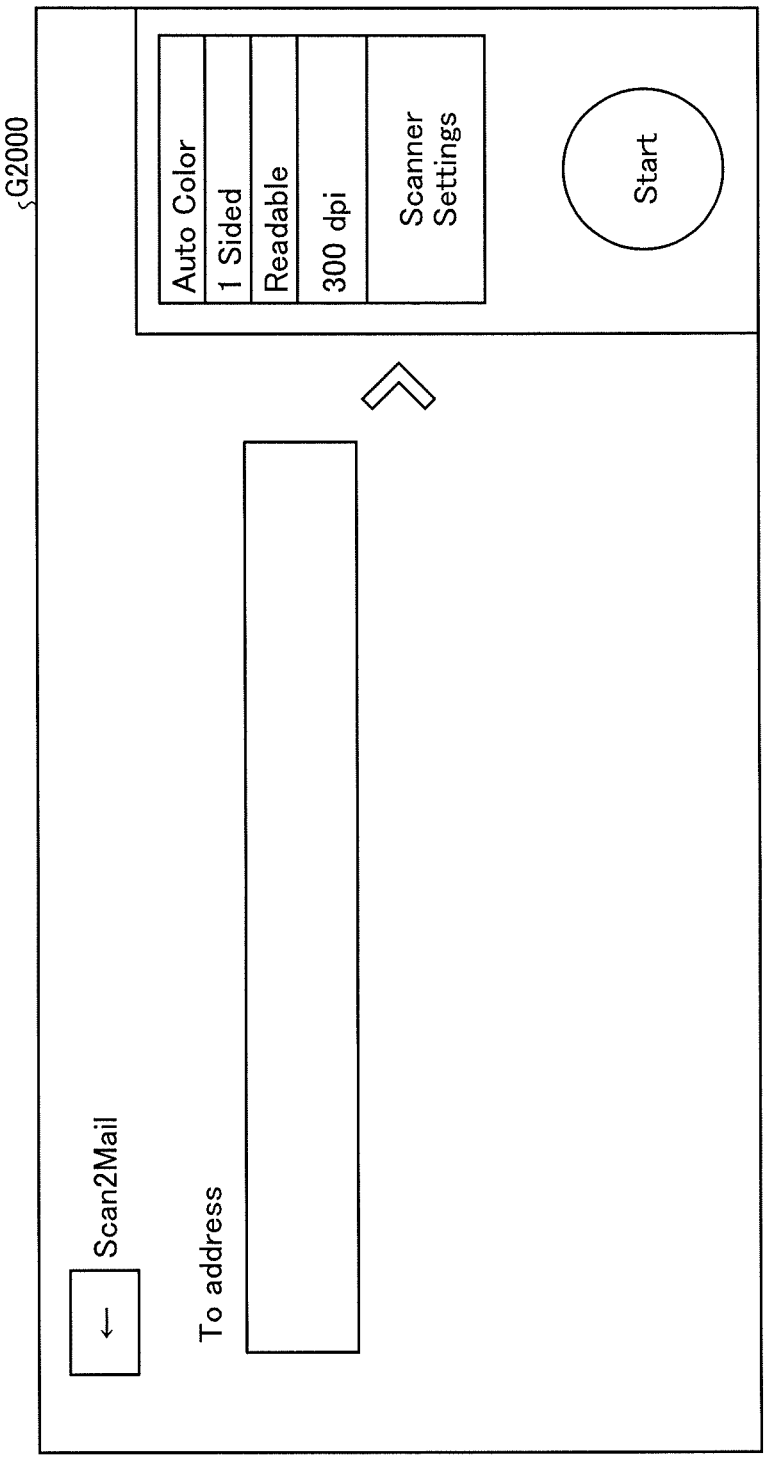
FIG. 23 is an illustration of an example of a parameter setting screen (1/2), according to the conventional art.
Figure 24:
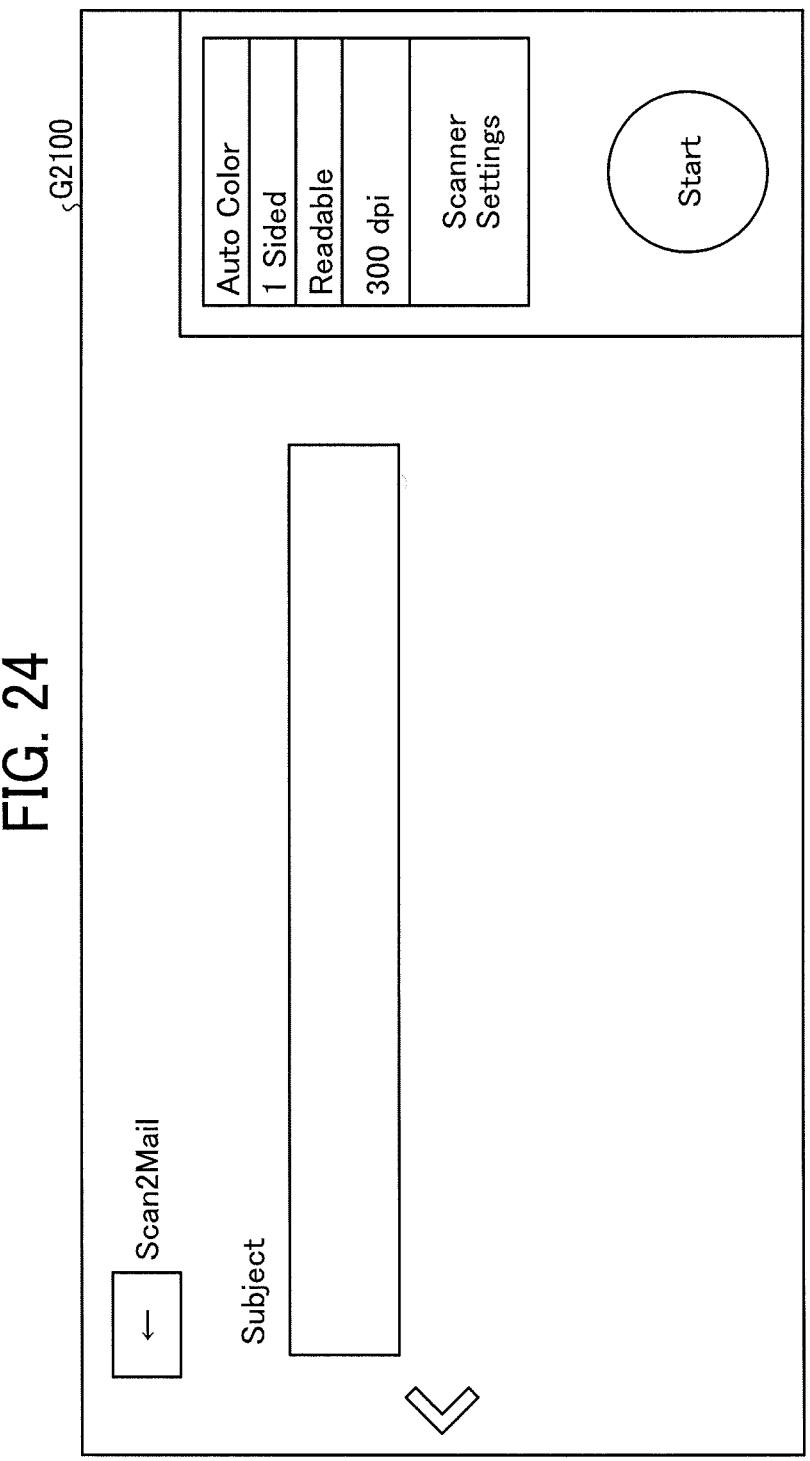
FIG. 24 is an illustration of an example of the parameter setting screen (2/2), according to the conventional art.

Meanwhile, as illustrated in FIG. 23 and FIG. 24, conventionally, when the application parameters are input, the page has to be switched for each of the parameters, and the parameter is then input, which complicates an input operation. In other words, the sending destination (To address) and the subject (Subject), both of which are the parameters related to sending of the mail, are separately displayed in the plurality of the pages despite a fact of being the parameters used for the same processing of sending the mail. Thus, the page has to be switched for each of the parameters, which complicates the input operation.

Any one of the above-described operations may be performed in various other ways, for example, in an order different from the one described above.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An information processing system comprising one or more information processing apparatuses and including a plurality of programs each executing a predetermined process, the information processing system comprising:
   a memory configured to store, for each application of a plurality of applications, each executing a series of processes using electronic data,
      (1) flow information in association with application setting information, the flow information defining program identification information identifying each of one or more programs executing the series of processes among the plurality of programs and an execution order in which the one or more programs are executed, the application setting information defining: (i) parameter setting information for setting parameters used to execute the one or more programs; (ii) group setting information for setting a group to which the parameters belong; and (iii) flow identification information identifying the flow information, and
      (2) use screen information defining a template of a use screen for using the application in association with application identification information identifying the application; and
   circuitry configured to
      receive a first request, including first application identification information, from a first electronic device of a plurality of electronic devices communicable with the information processing system,
      transmit first use screen information stored in the memory in association with the first application identification information included in the first request, and first application setting information including first group setting information stored in the memory in association with a first application identified by the first application identification information, to the first electronic device, which is a requesting source of the first request,
receive a second request including: (1) parameters that are set on a particular use screen displayed as being grouped at the first electronic device based on (i) the transmitted first use screen information, and (ii) first parameter setting information and the first group setting information defined in the first application setting information; (2) information on particular electronic data specified on the particular use screen; and (3) first flow identification information defined in the first parameter setting information,
acquire, from the memory, particular flow information identified by the particular flow identification information included in the received second request, and
execute each of the one or more programs identified by particular program identification information defined in the acquired particular flow information, in accordance with a particular execution order defined in the acquired particular flow information by using the particular parameters included in the second request, so as to execute the series of processes using the particular electronic data that is based on the information on the particular electronic data included in the received second request.

2. The information processing system according to claim 1, wherein the circuitry is further configured to
receive a third request including second application setting information created in a second electronic device of the plurality of electronic devices, and
store, in the memory, the second application setting information included in the received third request in association with second flow information identified by second flow identification information defined in the second application setting information.

3. The information processing system according to claim 2, wherein
the memory is further configured to store creation screen information on a creation screen that allows the second electronic device to create the second application setting information,
the circuitry is further configured to, in response to a request from the second electronic device, transmit the creation screen information stored in the memory to the second electronic device, which is a requesting source of the request, and
the third request includes second application identification information in which second parameter setting information, second group setting information, and the second flow identification information are defined, the second parameter setting information, the second group setting information, and the second flow identification information being created according to a user operation to the creation screen that is displayed at the second electronic device based on the transmitted creation screen information.

4. The information processing system according to claim 1, wherein the group setting information defines a display order in which each group that is set is to be displayed on the particular use screen displayed at the first electronic device.

5. The information processing system according to claim 1, wherein the group setting information defines a display order in which the parameters in each group are to be displayed on the particular use screen displayed at the first electronic device.

6. The information processing system according to claim 1, wherein in the group setting information, name information, to displaying a name of each group on the particular use screen displayed at the first electronic device is defined.

7. The information processing system according to claim 1, wherein the circuitry is further configured to
receive a third request including second application setting information created at a second electronic device of the plurality of electronic devices,
store, in the memory, second application setting information included in the received third request in association with second flow information identified by second flow identification information defined in the second application setting information, and
in response to the received third request, store the second application setting information, in which a predetermined group is deleted from the first group setting information, in the memory.

8. An information processing apparatus including a plurality of programs each executing a predetermined process, the information processing apparatus comprising:
a memory configured to store, for each application of a plurality of applications, each executing a series of processes using electronic data,
(1) flow information in association with application setting information, the flow information defining program identification information identifying each of one or more programs executing the series of processes among the plurality of programs and an execution order in which the one or more programs are executed, the application setting information defining: (i) parameter setting information for setting parameters used to execute the one or more programs; (ii) group setting information for setting a group to which the parameters belong; and (iii) flow identification information identifying the flow information, and
(2) use screen information defining a template of a use screen for using the application in association with application identification information identifying the application; and
circuitry configured to
receive a first request, including first application identification information, from a first electronic device of a plurality of electronic devices communicable with the information processing apparatus,
transmit first use screen information stored in the memory in association with the first application identification information included in the first request, and first application setting information including first group setting information stored in the memory in association with a first application identified by the first application identification information, to the first electronic device, which is a requesting source of the first request,
receive a second request including: (1) particular parameters that are set on a particular use screen displayed as being grouped at the first electronic device based on (i) the transmitted first use screen information, and (ii) first parameter setting information and the first group setting information defined in the first application setting information; (2) information on particular electronic data specified on the particular use screen; and (3) first flow identification information defined in the first parameter setting information,
acquire, from the memory, particular flow information identified by the particular flow identification information included in the received second request, and execute each of the one or more programs identified by particular program identification information defined in the acquired particular flow information, in accordance with a particular execution order defined in the acquired particular flow information by using the particular parameters included in the second request, so as to execute the series of processes using the particular electronic data that is based on the information on the particular electronic data included in the received second request.

9. An information processing method used in an information processing apparatus, the information processing apparatus including a plurality of programs each executing a predetermined process, the information processing apparatus comprising: a memory configured to store, for each application of a plurality of applications, each executing a series of processes using electronic data, (1) flow information in association with application setting information, the flow information defining program identification information identifying each of one or more programs executing the series of processes among the plurality of programs and an execution order in which the one or more programs are executed, the application setting information defining: (i) parameter setting information for setting parameters used to execute the one or more programs; (ii) group setting information for setting a group to which the parameters belong; and (iii) flow identification information identifying the flow information, and (2) use screen information defining a template of a use screen for using the application in association with application identification information identifying the application, the information processing method comprising:

receiving a first request, including first application identification information, from a first electronic device of a plurality of electronic devices communicable with the information processing apparatus, transmitting first use screen information stored in the memory in association with first application identification information included in the first request, and first application setting information including first group setting information stored in the memory in association with a first application identified by the first application identification information, to the first electronic device, which is a requesting source of the first request, receiving a second request including: (1) particular parameters that are set on a particular use screen displayed as being grouped at the first electronic device based on (i) the transmitted first use screen information, and (ii) first parameter setting information and the first group setting information defined in the first application setting information; (2) information on particular electronic data specified on the particular use screen; and (3) first flow identification information defined in the first parameter setting information, acquiring, from the memory, particular flow information identified by the particular flow identification information included in the received second request, and executing each of the one or more programs identified by particular program identification information defined in the acquired particular flow information, in accordance with a particular execution order defined in the acquired particular flow information by using the particular parameters included in the second request, so as to execute the series of processes using the particular electronic data that is based on the information on the particular electronic data included in the received second request.

* * * * *